(12) United States Patent
Fontaine et al.

(10) Patent No.: US 12,472,261 B2
(45) Date of Patent: Nov. 18, 2025

(54) CONJUGATED INHIBITORS OF DNA DAMAGE RESPONSE

(71) Applicant: ProLynx LLC, San Francisco, CA (US)

(72) Inventors: Shaun D. Fontaine, Concord, CA (US); Brian R. Hearn, Moraga, CA (US); Daniel V. Santi, San Francisco, CA (US)

(73) Assignee: ProLynx LLC, San Francisco, CA (US)

( * ) Notice: Subject to any disclaimer, the term of this patent is extended or adjusted under 35 U.S.C. 154(b) by 768 days.

(21) Appl. No.: 17/639,234

(22) PCT Filed: Aug. 28, 2020

(86) PCT No.: PCT/US2020/048608
§ 371 (c)(1),
(2) Date: Feb. 28, 2022

(87) PCT Pub. No.: WO2021/041964
PCT Pub. Date: Mar. 4, 2021

(65) Prior Publication Data
US 2022/0331437 A1    Oct. 20, 2022

Related U.S. Application Data

(60) Provisional application No. 62/893,075, filed on Aug. 28, 2019.

(51) Int. Cl.
| | | |
|---|---|---|
| *A61K 47/60* | (2017.01) | |
| *A61K 31/4155* | (2006.01) | |
| *A61K 31/4745* | (2006.01) | |
| *A61K 31/553* | (2006.01) | |

(52) U.S. Cl.
CPC .......... *A61K 47/60* (2017.08); *A61K 31/4155* (2013.01); *A61K 31/4745* (2013.01); *A61K 31/553* (2013.01)

(58) Field of Classification Search
None
See application file for complete search history.

(56) References Cited

U.S. PATENT DOCUMENTS 8,703,907 B2    4/2014  Ashley et al.

FOREIGN PATENT DOCUMENTS

| CN | 106061483 | 10/2016 |
|---|---|---|
| WO | WO-2013/059323 | 4/2013 |
| WO | WO-2015/051307 | 4/2015 |
| WO | WO-2019/140266 | 7/2019 |
| WO | WO-2019/140271 | 7/2019 |
| WO | WO-2020/206358 | 10/2020 |
| WO | WO-2021/026494 | 2/2021 |

OTHER PUBLICATIONS

Cardillo et al., "Synthetic Lethality Exploitation by an Anti-Trop2-SN-38 Antibody-Drug Conjugate, IMMU-132, Plus PARP Inhibitors in BRCA1/2-wild-type Triple-Negative Breast Cancer," Clinical Cancer Research (2017) 23(13):3405-3415.
International Search Report for PCT/US20/48608, mailed Jan. 22, 2021, 4 pages.
PubChem-CID-9931954, Create Date: Oct. 25, 2006, 43 pages.
PubChem-CID-135565082, Create Date: Jan. 15, 2019, 38 pages.

*Primary Examiner* — Michael G. Hartley
*Assistant Examiner* — Samantha L Mejias
(74) *Attorney, Agent, or Firm* — MORRISON & FOERSTER LLP

(57) ABSTRACT

Provided herein are releasable conjugates of inhibitors of DNA damage response suitable for use as therapeutic agents in the treatment of disease.

16 Claims, 12 Drawing Sheets

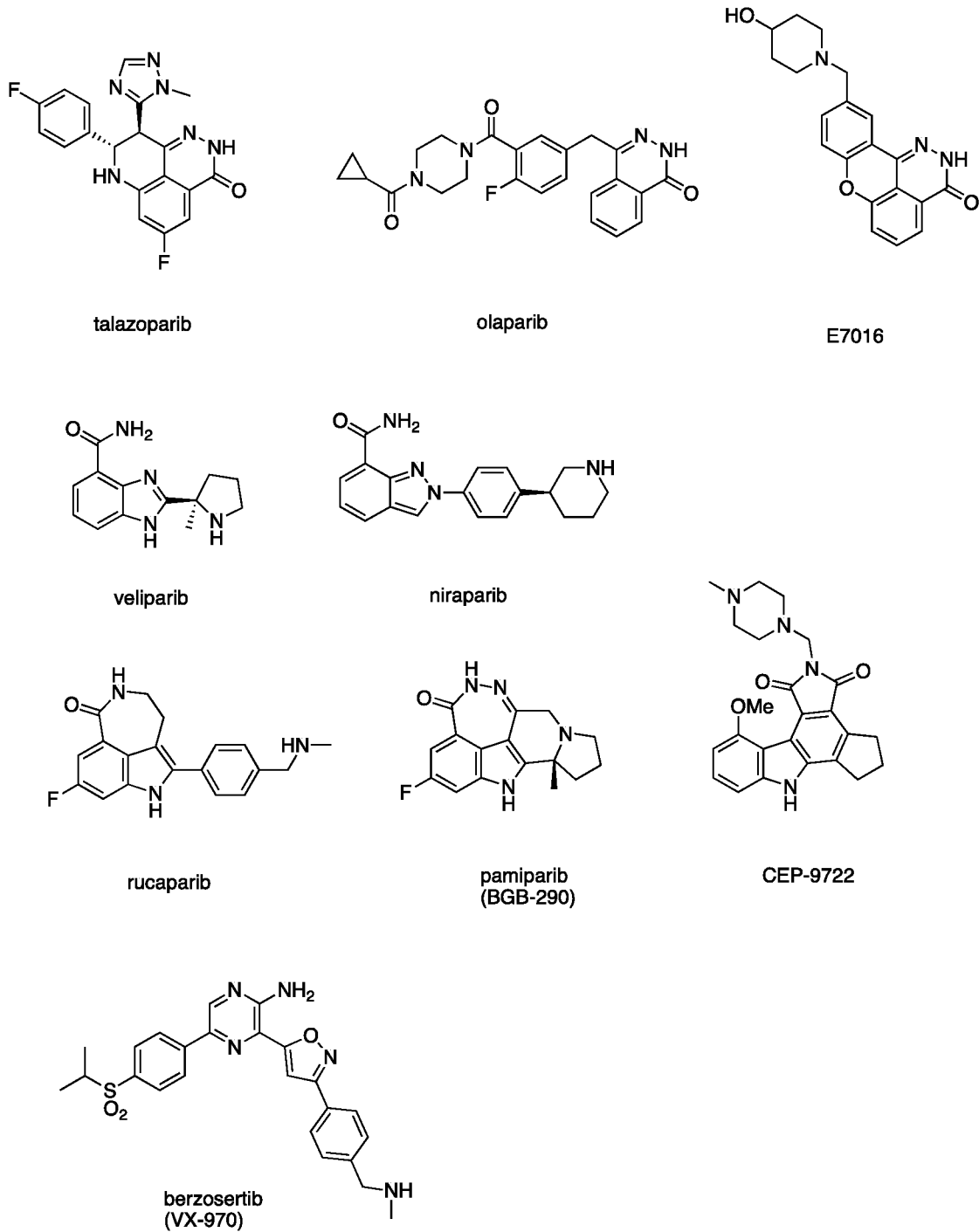
Figure 1. Inhibitors of DNA damage response

Figure 2. Preparation of releasable PEG-talazoparibs
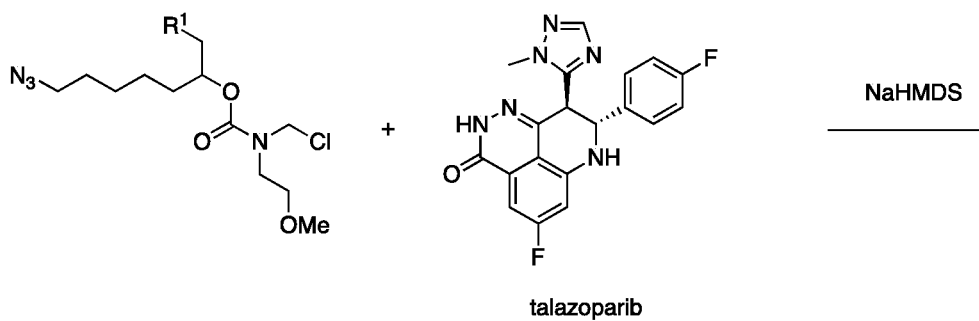
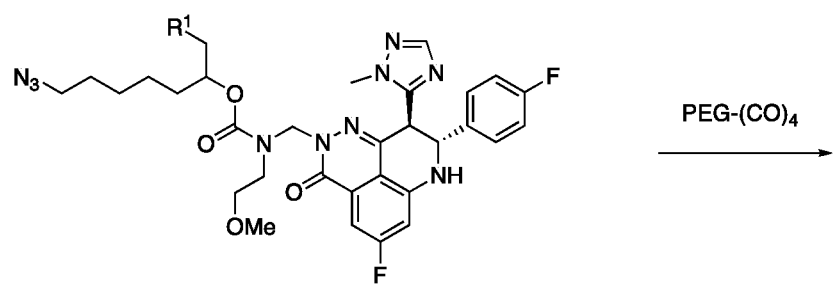
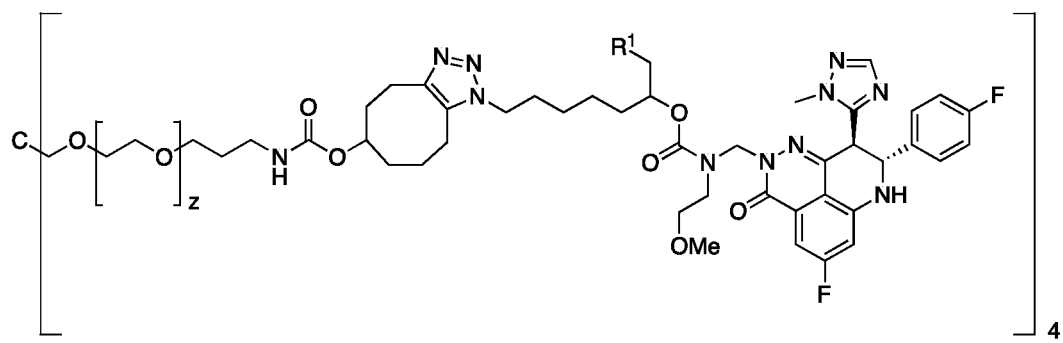

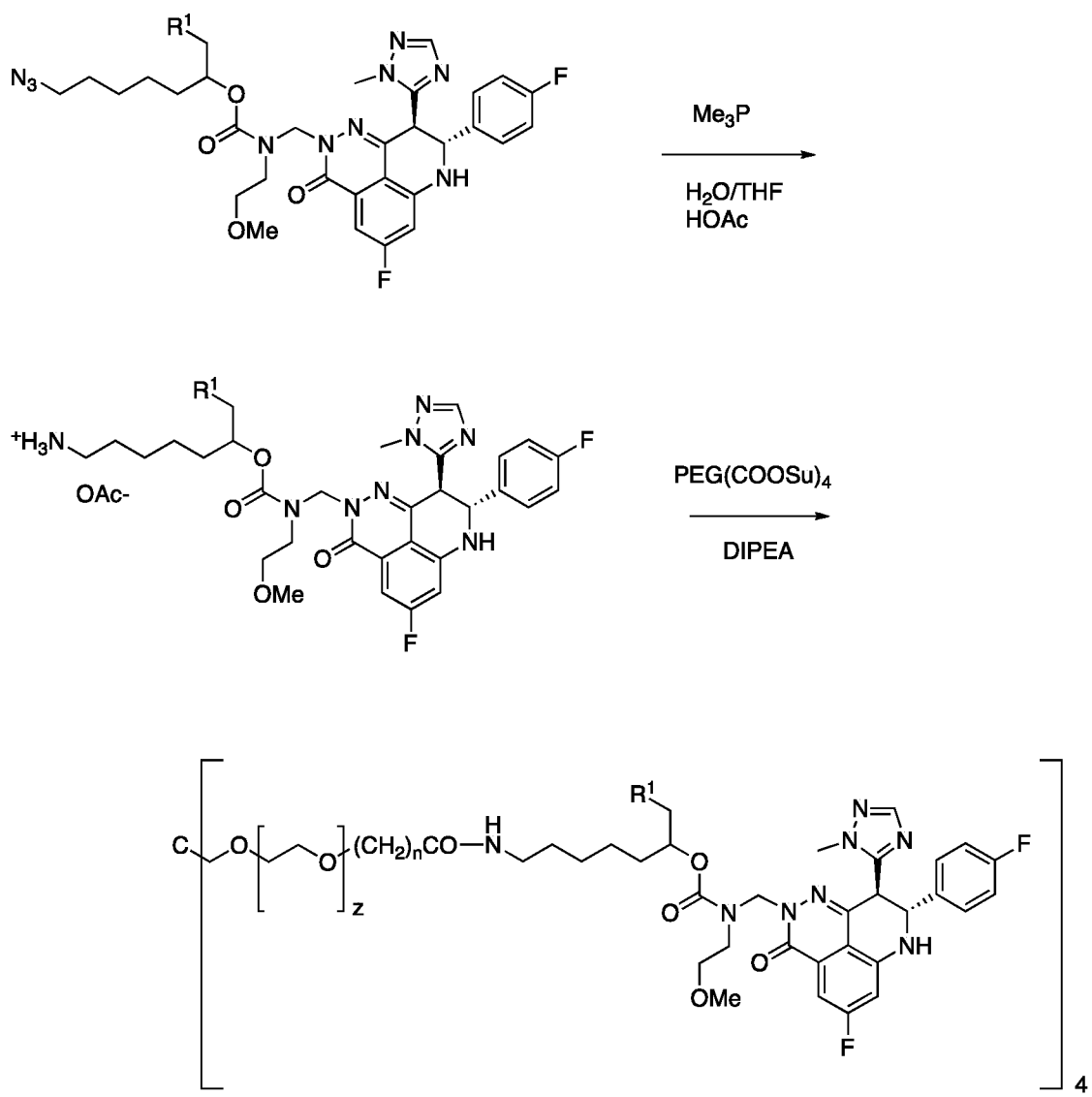
Figure 3. Alternate synthesis of conjugated talazoparib

Figure 4. Preparation of conjugated Rucaparib
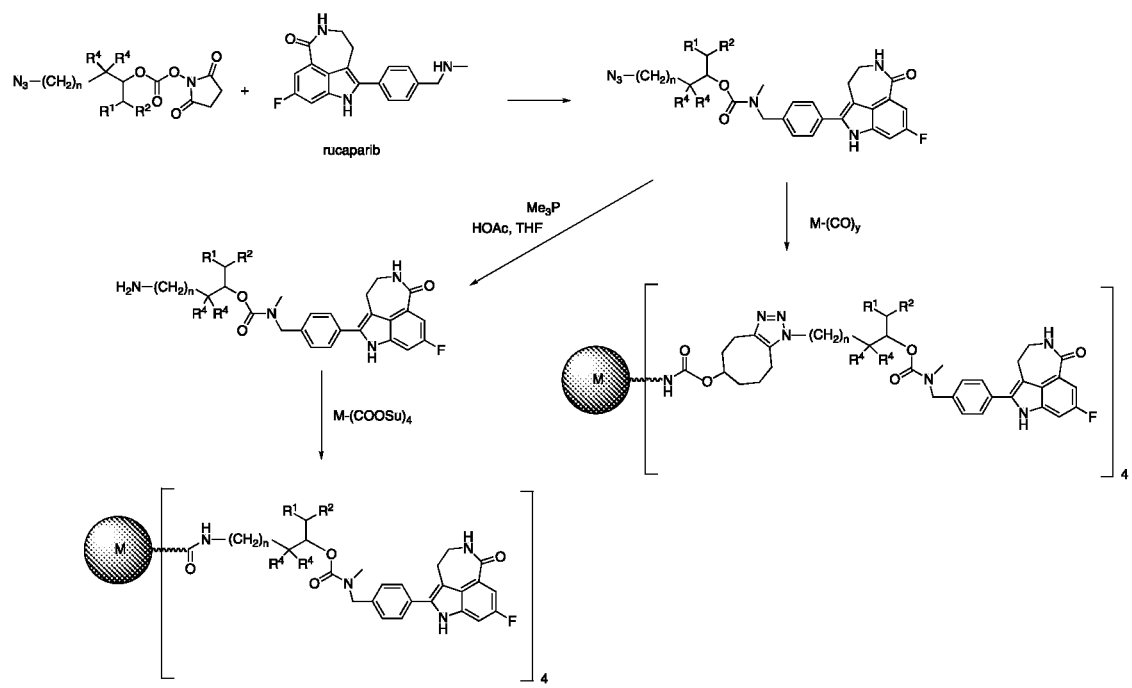

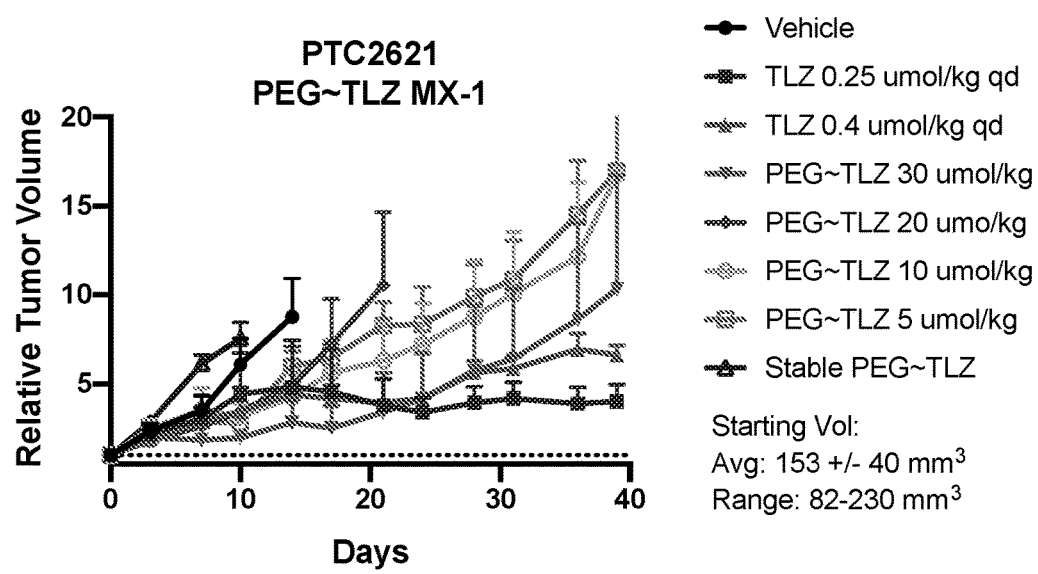
Figure 5. Relative tumor volume versus time. Mice bearing MX-1 xenografts were treated on day 0 with vehicle (●), daily oral TLZ at 0.25 (■) or 0.4 μmol/kg (▲), a single ip dose of releasable PEG~TLZ at 30 (▼), 20 (◆), 10(○), 5 (□) or a single ip dose of 30 μmol/kg stable PEG~TLZ (△). Relative tumor volumes are plotted as average ± SEM.

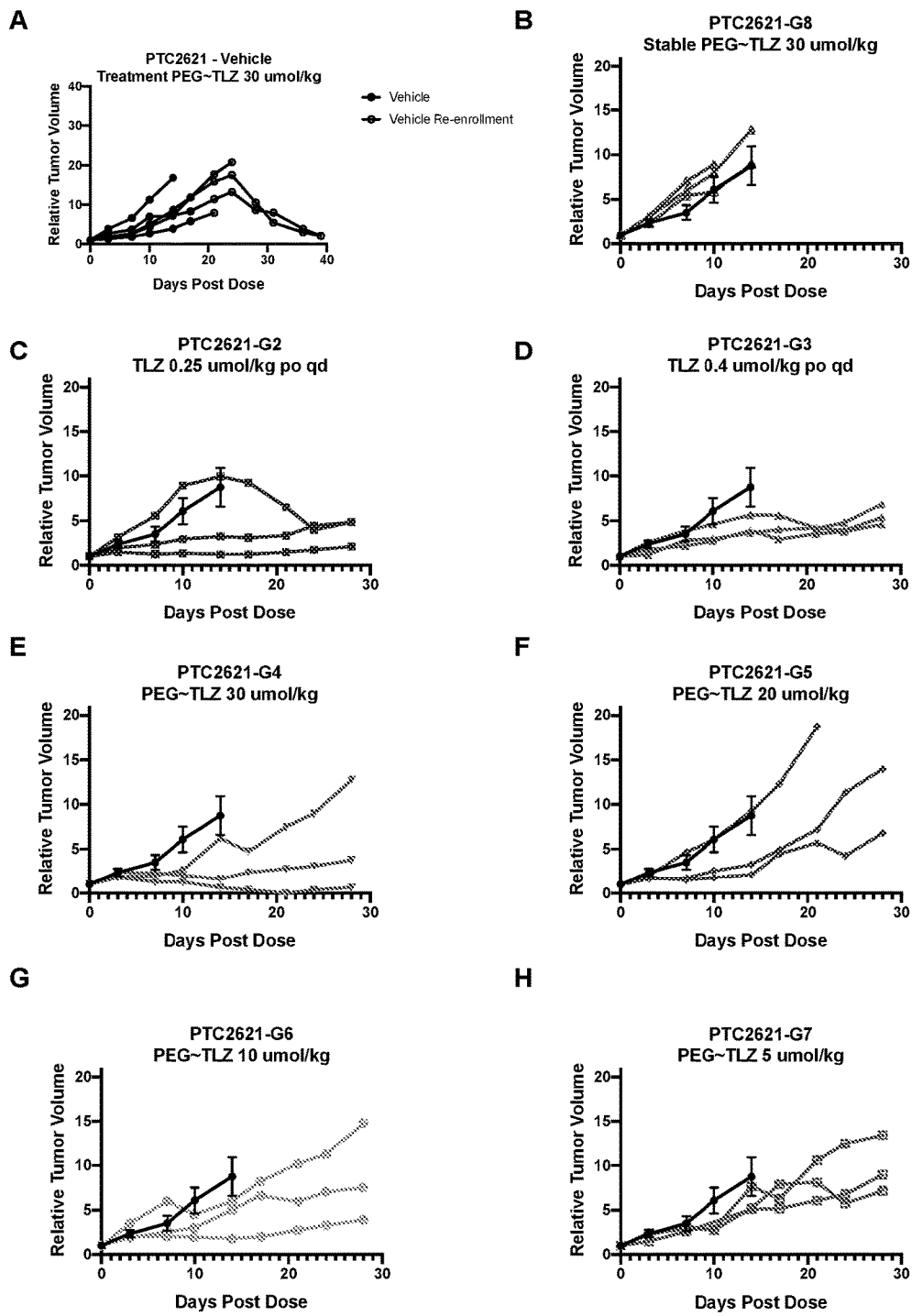
Figure 6. Individual relative tumor volume for: vehicle (●), daily oral TLZ at 0.25 (▩) or 0.4 μmol/kg (▲), a single ip dose of PEG~TLZ at 30 (▼), 20 (◆), 10(○), 5 (□) or a single ip dose of 30 μmol/kg stable PEG~TLZ (△). Relative tumor volumes are plotted as average ± SEM.

Stability of non-releasable acylated conjugate (Mod = H).

Release kinetics and stability of releasable conjugate (Mod = SO$_2$Me).

Plasma concentration versus time plot for non-releasable PEG-talazoparib conjugate (Mod = H) (○), releasable PEG-talazoparib conjugate (Mod = SO$_2$Me) (●), and talazoparib released from releasable PEG-talazoparib conjugate (▲) in mice.

CONJUGATED INHIBITORS OF DNA DAMAGE RESPONSE

CROSS-REFERENCE TO RELATED APPLICATIONS

This application is a national stage application under 35 U.S.C. § 371 of International Application No. PCT/US2020/048608, filed internationally on Aug. 28, 2020, which claims priority to U.S. Provisional Application No. 62/893,075, filed on Aug. 28, 2019, the contents of which are incorporated herein by reference in [its] their entirety.

BACKGROUND OF THE INVENTION

DNA is damaged multiple times during each cell cycle, for example through the action of reactive oxygen species, ultraviolet and ionizing radiation. DNA damage response (DDR) takes many forms, depending on the nature of the damage. Single-strand breaks (nicks) may be repaired by mismatch repair (MMR), nucleotide excision repair (NER) or base excision repair (BER). If single-strand DNA breaks are not repaired prior to DNA replication (which must precede cell division), highly toxic double-strand DNA breaks may form during the replication process. It is estimated that cells accumulate about 50 double strand breaks each day, mostly induced by reactive oxygen species. There are two main pathways for double strand break repair. When a sister chromatid is available, during late S-phase and G2 phase, homologous recombination repair (HRR) provides error-free repair. When no sister chromatid is available, non-homologous end joining (NHEJ) directly ligates the break ends without a template often resulting in errors and loss of genetic information.

Enzymes such as BRCA1, BRCA2, and PALB2 are important for the repair of such double-strand DNA breaks through the process of error-free homologous recombinational repair (HRR). Mutations in these proteins greatly increase the susceptibility to cancer, and are most common in breast, ovarian, and prostate cancers.

Inhibiting the DNA damage response (DDR) is a potentially valuable therapy for treatment of cancers, given that many cancers are defective in one or more individual repair pathways and are thus more highly reliant on the remaining functional pathways. Resistance to genotoxic therapies may also be associated with increased DDR signaling, and inhibition of such signaling may potentiate radiation and genotoxic therapies.

PARP inhibitors block the action of the enzyme poly(ADP-ribose) polymerase (PARP), a family of proteins involved in DNA repair, genomic stability, and programmed cell death. PARP detects single-strand DNA breaks, e.g. those caused by chemical agents or radiation, and initiates a repair response by synthesis of poly(ADP-ribose), which acts as a signal for enzymes involved in DNA strand-break repair. PARP inhibitors thus cause accumulation of double stranded DNA breaks, and ultimately the death of cells defective in HRR such as those with mutated BRCA1, BRCA2, or PALB2. Similarly, cells lacking the tumor suppressor PTEN may be sensitive to PARP inhibition because of down-regulation of the HRR component Rad51.

Several PARP inhibitors have been approved for the treatment of cancer, including olaparib (patients with germline BRCA mutated advanced ovarian cancer), rucaparib (BRCA-mutant ovarian cancer), niraparib (epithelial, fallopian tube, and primary peritoneal cancer), and talazoparib (germline BRCA-mutated breast cancer). Other PARP inhibitors are in clinical trials, including veliparib (advanced ovarian, triple-negative breast, and non-small cell lung cancers), pamiparib, CEP-9722 (non-small cell lung cancer), and E7016 (melanoma).

Other prominent targets in the DDR pathway are the ATM and ATR kinases, which induce cell cycle arrest and facilitate DNA damage repair through downstream targets such as CHK1 and CHK2. These act to reduce cyclin-dependent kinase (CDK) activity, which results in slow-down and arrest of cell cycle progression at the G1-S, intra-S, and G2-M cell cycle checkpoints and thereby increase the time available to repair the DNA damage before replication or mitosis. ATM and ATR further induce transcription of DNA repair proteins and enhance their activation through post-translational modification.

Due to their effect on DNA repair, inhibitors of the DNA damage response may also synergize the effects of DNA damaging chemotherapeutic agents, particularly topoisomerase inhibitors (camptothecins, irinotecan, topotecan, SN-38, etoposide, and similar compounds), which cause DNA strand breaks through trapping of the topoisomerase-1/DNA cleavage complex that occurs during DNA replication and transcription; DNA strand crosslinkers such as platinum complexes (oxaliplatin, cisplatin, carboplatin); and single-strand break inducers such as radiation, bleomycin, and enediynes.

Single-strand DNA damage may also be initiated by treatment with chemotherapy agents, and thus may act synergistically with PARP inhibitors in cancer treatment. Unfortunately, the undesired toxicity of these agents is typically also synergistic, which greatly limits the ability to treat with these combinations. As the undesired toxicity is due to the combined presence of the two agents at high levels in normal (i.e., non-tumor) tissue, a method is needed to prevent the simultaneous systemic exposure of the chemotherapy agent and the PARP inhibitor while providing simultaneous tumor exposure. One method to accomplish this is disclosed in pending PCT patent application PCT/US19/13314, "Synergistic Cancer Treatment," filed 11 Jan. 2019. This disclosure uses releasable PEG-conjugates of topoisomerase inhibitors that accumulate in tumor tissue due to the enhanced permeability and retention (EPR) effect, which was disclosed in pending PCT application PCT/US19/13306, "Protocol for Minimizing Toxicity of Combination Dosages and Imaging Agent for Verification," filed 11 Jan. 2019. In this method, the chemotherapeutic agent is releasably conjugated to a large polyethylene glycol carrier having a hydrodynamic radius of approximately 10 nm. Due to the impaired lymphatic draining of tumor tissue relative to normal tissue, such nanoparticulate conjugates get trapped and accumulate in the tumor tissue while clearing from the systemic circulation and normal tissues. While trapped in the tumor, the conjugates release the chemotherapeutic agent that is then taken up into the tumor cells and acts to initiate DNA damage. Once the conjugate is cleared from the system circulation, an inhibitor of DNA damage repair is then provided during the period when the conjugated chemotherapeutic agent is present in the tumor but not in the normal tissues.

As an alternate method, the inhibitor of DNA repair may also be provided as a tumor-accumulating conjugate, thereby amplifying the accumulation in tumor tissue and minimizing exposure of normal tissue to the DNA damage repair agent. The present invention provides such conjugates of DNA damage repair.

BRIEF DESCRIPTION OF THE INVENTION

The present invention provides releasable conjugates of inhibitors of DNA damage response suitable for use as therapeutic agents in the treatment of disease. Given the propensity for soluble conjugates to accumulate in tumor tissues, as well as the potential for direct administration of insoluble conjugates to tumor tissues via intratumoral injection, these conjugates are expected to provide high local concentrations of DNA damage response inhibitors in tumors while minimizing systemic exposure, thus ameliorating systemic toxicities.

In one aspect, present invention thus provides conjugated inhibitors of DNA damage response having formula (I)

wherein M is a macromolecular carrier; y is a number describing the number of linker-drugs L-D attached to M; Z* is a connecting functionality; L is a releasable linker; and D is an inhibitor of DNA damage response. In some embodiments, M is a soluble macromolecular carrier and y=1-8. In some embodiments, M is a soluble macromolecular carrier of molecular weight between 1,000-100,000 Daltons and y=1-8. In other embodiments, M is an insoluble macromolecular carrier, and y is a multiplicity describing the concentration of D on M.

In some embodiments, the invention provides conjugates of formula (I) wherein D comprises a primary or secondary amine connected to linker L via a releasable carbamate group. In another aspect, the invention provides conjugates of formula (I) wherein D comprises an acyl-hydrazone connected to linker L via a carbamoyl-methylene group.

In some embodiments, the invention provides methods for the preparation of the compounds of the invention and their use in the treatment of disease.

DESCRIPTION OF THE DRAWINGS

FIG. 1 shows structures of various inhibitors of DNA damage response

FIG. 2 illustrates one embodiment of a releasable PEG conjugate of the PARP inhibitor talazoparib (TLZ) wherein Z* is a triazole, and a method for its preparation.

FIG. 3 illustrates a second embodiment of a releasable PEG conjugate of the PARP inhibitor talazoparib (TLZ) wherein Z* is a carboxamide, and a method for its preparation.

FIG. 4 illustrates one embodiment of a releasable PEG conjugate of the PARP inhibitor rucaparib, and a method for its preparation.

FIG. 5 shows the efficacy of a releasable PEG-talazoparib (PEG-TLZ) against the MX-1 mouse xenograft. Panel A shows tumor volumes after treatment with a single IP dose of releasable PEG-TLZ (5, 10, 20, or 30 μmol TLZ/kg) versus daily oral doses of free TLZ (0.25 or 0.4 μmol/kg TLZ). Also shown is a non-releasable PEGylated TLZ, which is ineffective.

FIG. 6 shows the individual tumor volumes for the experiment summarized in FIG. 5.

DESCRIPTION OF THE EMBODIMENTS

Figure 7:
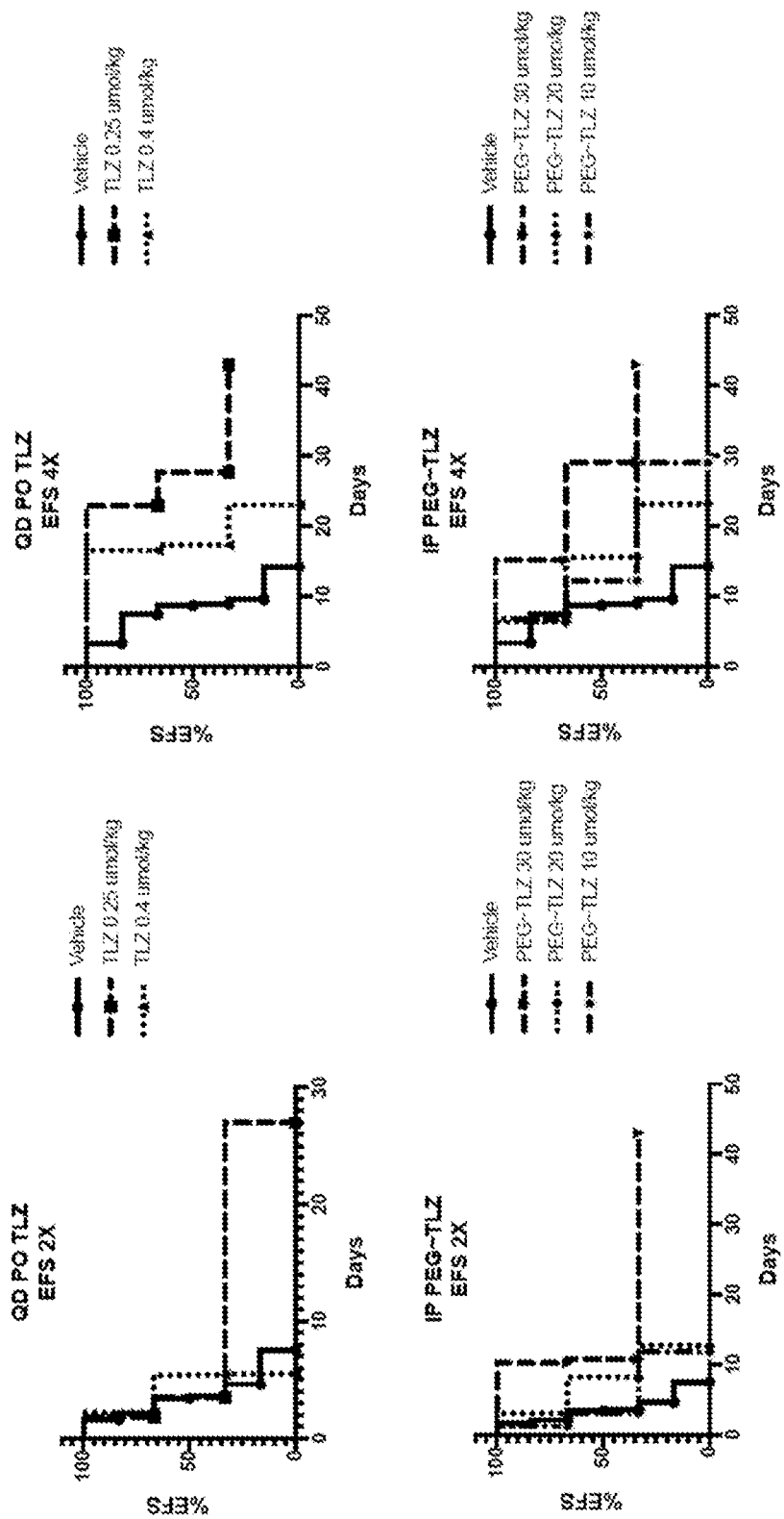
FIG. 7 shows the event-free survival data for the experiment summarized in FIG. 5.

The present invention provides conjugated inhibitors of DNA damage response having formula (I)

wherein M is a macromolecular carrier; y is a number describing the number of linker-drugs L-D attached to M (e.g., 1 to multiplicity); Z* is a connecting functionality; L is a releasable linker; and D is an inhibitor of DNA damage response. In some embodiments, y is 1 to multiplicity. In some embodiments, M is a soluble macromolecular carrier and y=1-8. In some embodiments, M is a soluble macromolecular carrier of molecular weight between 1,000-100,000 Daltons and y=1-8. In some embodiments, M is an insoluble macromolecular carrier, and y is a multiplicity describing the concentration of D on M.

The linkers of the invention releasably connect the inhibitors to the carrier. Under appropriate conditions, the linkers cleave to release the free inhibitor. In embodiments of the invention, the linker-drugs have formula (II) and release drug through a non-hydrolytic beta-elimination mechanism as disclosed, for example, in U.S. Pat. Nos. 8,680,315 and 8,754,190 (both incorporated herein by reference).

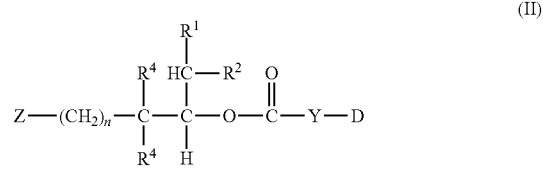

wherein Z is a connecting group allowing for conjugation of the linker-drug to a macromolecular carrier; n=0-6; $R^1$ and $R^2$ are each independently H, CN, or $SO_2R^5$, wherein $R^5$ is optionally substituted $C_1$-$C_6$ alkyl, optionally substituted aryl, optionally substituted heteroaryl, or $N(R^6)_2$, wherein each $R^6$ is independently optionally substituted $C_1$-$C_6$ alkyl, optionally substituted aryl, optionally substituted heteroaryl, or wherein $N(R^6)_2$ forms a ring of 4-8 atoms; each $R^4$ is independently H or $C_1$-$C_3$ alkyl or taken together form a 3-6 member ring; and Y is either absent or has the formula $N(R^7)CH_2$, wherein $R^7$ is optionally substituted $C_1$-$C_4$ alkyl or optionally substituted aryl; and wherein at least one of $R^1$ and $R^2$ is other than H. In some embodiments, Z is a connecting group allowing for conjugation of the linker-drug to a macromolecular carrier; n=1-4; $R^1$ and $R^2$ are each independently H, CN, or $SO_2R^5$, wherein $R^5$ is optionally substituted $C_1$-$C_6$ alkyl, optionally substituted aryl, optionally substituted heteroaryl, or $N(R^6)_2$, wherein each $R^6$ is independently optionally substituted $C_1$-$C_6$ alkyl, optionally substituted aryl, optionally substituted heteroaryl, or wherein $N(R^6)_2$ forms a ring of 4-8 atoms; each $R^4$ is independently H or $C_1$-$C_3$ alkyl or taken together form a 3-6 member ring; and Y is either absent or has the formula $N(R^7)CH_2$, wherein $R^7$ is optionally substituted $C_1$-$C_4$ alkyl; and wherein at least one of $R^1$ and $R^2$ is other than H.

It is understood that the term "alkyl" includes linear, branched, or cyclic saturated hydrocarbon groups of 1-20, 1-12, 1-8, 1-6, or 1-4 carbon atoms. In some embodiments, an alkyl is linear or branched. Examples of linear or branched alkyl groups include, without limitation, methyl, ethyl, n-propyl, isopropyl, n-butyl, t-butyl, isobutyl, sec-butyl, n-pentyl, n-hexyl, n-heptyl, n-octyl, n-nonyl, n-decyl, and the like. In some embodiments, an alkyl is cyclic. Examples of cyclic alkyl groups include, without limitation, cyclopropyl, cyclobutyl, cyclopentyl, cyclopentadienyl, cyclohexyl, and the like.

It is understood that the term "alkoxy" includes alkyl groups bonded to oxygen, including methoxy, ethoxy, isopropoxy, cyclopropoxy, cyclobutoxy, and the like.

It is understood that the term "alkenyl" includes non-aromatic unsaturated hydrocarbons with carbon-carbon double bonds and 2-20, 2-12, 2-8, 2-6, or 2-4 carbon atoms.

It is understood that the term "alkynyl" includes non-aromatic unsaturated hydrocarbons with carbon-carbon triple bonds and 2-20, 2-12, 2-8, 2-6, or 2-4 carbon atoms.

It is understood that the term "aryl" includes aromatic hydrocarbon groups of 6-18 carbons, preferably 6-10 carbons, including groups such as phenyl, naphthyl, and anthracenyl. The term "heteroaryl" includes aromatic rings comprising 3-15 carbons containing at least one N, O or S atom, preferably 3-7 carbons containing at least one N, O or S atom, including groups such as pyrrolyl, pyridyl, pyrimidinyl, imidazolyl, oxazolyl, isoxazolyl, thiazolyl, isothiazolyl, quinolyl, indolyl, indenyl, and the like.

In some instances, alkenyl, alkynyl, aryl or heteroaryl moieties may be coupled to the remainder of the molecule through an alkyl linkage. Under those circumstances, the substituent will be referred to as alkenylalkyl, alkynylalkyl, arylalkyl or heteroarylalkyl, indicating that an alkylene moiety is between the alkenyl, alkynyl, aryl or heteroaryl moiety and the molecule to which the alkenyl, alkynyl, aryl or heteroaryl is coupled.

It is understood that the term "halogen" or "halo" includes bromo, fluoro, chloro and iodo.

It is understood that the term "heterocyclic ring" or "heterocyclyl" refers to a 3-15 membered aromatic or non-aromatic ring comprising at least one N, O, or S atom. Examples include, without limitation, piperidinyl, piperazinyl, tetrahydropyranyl, pyrrolidine, and tetrahydrofuranyl, as well as the exemplary groups provided for the term "heteroaryl" above. In some embodiments, a heterocyclic ring or heterocyclyl is non-aromatic. In some embodiments, a heterocyclic ring or heterocyclyl is aromatic.

It is understood that "optionally substituted," unless otherwise specified, means that a group may be unsubstituted or substituted by one or more (e.g., 1, 2, 3, 4 or 5) of the substituents which may be same or different. Examples of substituents include, without limitation, alkyl, alkenyl, alkynyl, halogen, —CN, —$OR^{aa}$, —$SR^{aa}$, —$NR^{aa}R^{bb}$, —$NO_2$, —C=$NH(OR^{aa})$, —$C(O)R^{aa}$, —$OC(O)R^{aa}$, —$C(O)OR^{aa}$, —$C(O)NR^{aa}R^{bb}$, —$OC(O)NR^{aa}R^{bb}$, —$NR^{aa}C(O)R^{bb}$, —$NR^{aa}C(O)OR^{bb}$, —$S(O)R^{aa}$, —$S(O)_2R^{aa}$, —$NR^{aa}S(O)R^{bb}$, —$C(O)NR^{aa}S(O)R^{bb}$, —$NR^{aa}S(O)_2R^{bb}$, —$C(O)NR^{aa}S(O)_2R^{bb}$, —$S(O)NR^{aa}R^{bb}$, —$S(O)_2NR^{aa}R^{bb}$, —$P(O)(OR^{aa})(OR^{bb})$, heterocyclyl, heteroaryl, or aryl, wherein the alkyl, alkenyl, alkynyl, cycloalkyl, heterocyclyl, heteroaryl, and aryl are each independently optionally substituted by $R^{cc}$, wherein $R^{aa}$ and $R^{bb}$ are each independently H, alkyl, alkenyl, alkynyl, heterocyclyl, heteroaryl, or aryl, or $R^{aa}$ and $R^{bb}$ are taken together with the nitrogen atom to which they attach to form a heterocyclyl, which is optionally substituted by alkyl, alkenyl, alkynyl, halogen, hydroxyl, alkoxy, or —CN, and wherein:

each $R^{cc}$ is independently alkyl, alkenyl, alkynyl, halogen, heterocyclyl, heteroaryl, aryl, —CN, or —$NO_2$.

For use herein, unless clearly indicated otherwise, use of the terms "a", "an" and the like refers to one or more.

The elimination rate is primarily controlled by groups $R^1$ and $R^2$, at least one of which is an electron-withdrawing group such as CN or $C_1$-$C_6$ alkylsulfone, arylsulfone, or heteroaryl-sulfone, or a sulfonamide, each optionally substituted. Descriptions of appropriate electron-withdrawing groups can be found in U.S. Pat. Nos. 8,680,315 and 8,754,190. In some embodiments, at least one of $R^1$ and $R^2$ is —CN, —$SO_2N(CH_3)_2$, —$SO_2CH_3$, —$SO_2Ph$, —$SO_2PhCl$, —$SO_2N(CH_2CH_2)_2O$, —$SO_2CH(CH_3)_2$, —$SO_2N(CH_3)(CH_2CH_3)$, or —$SO_2N(CH_2CH_2OCH_3)_2$. In some embodiments, one of $R^1$ and $R^2$ is $SO_2R^5$ and the other is H. In some embodiments, one of $R^1$ and $R^2$ is —$SO_2CH_3$ and the other is H. In some embodiments, $R^1$ and $R^2$ are selected to provide a half-life for D release between 100-1000 hours at pH 7.4, 37° C. Groups $R^4$ may be H or optionally substituted $C_1$-$C_3$ alkyl, or both $R^4$ taken together may form a 3-6 member ring. In some embodiments, each $R^4$ is independently H or $C_1$-$C_3$ alkyl. In some embodiments, each $R^4$ is independently H or methyl. In some embodiments, $R^4$ is H. Z is a functional group allowing for connection of the linker to macromolecular carrier M through reaction with a cognate functional group Z'. Typical examples of Z include halogen, azide, alkenes, alkyne, thiol, maleimide, carbonyl, carboxylic acid, amine, and aminooxy groups, resulting in M-Z*-L connections wherein X is an ether, thioether, 1,2,3-triazole, oxime, or carboxylic amide (carboxamide) when Z' is as described below.

In some embodiments, Y is absent or is $N(R^7)CH_2$. In some embodiments, Y is absent. In some embodiments, Y is $N(R^7)CH_2$. In some embodiments, $R^7$ is optionally substituted $C_1$-$C_6$ alkyl. In some embodiments, $R^7$ is $C_1$-$C_6$ alkyl optionally substituted with $C_1$-$C_6$ alkoxy or —OH. In some embodiments, $R^7$ is —$CH_2CH_2OCH_3$ or —$CH_3$. In some embodiments, $R^7$ is optionally substituted aryl. In some embodiments, $R^7$ is optionally substituted phenyl. In some embodiments, $R^7$ is phenyl optionally substituted by —$C(O)NR^{aa}R^{bb}$.

By DNA damage response inhibitor is meant a compound that interferes with one or more processes by which DNA strand breaks are repaired. Typical DNA damage response inhibitors inhibit the activity of DNA repair enzymes such as PARP, ATR, or ATM.

The DNA damage response inhibitors useful in the invention generally fall into two structural classes. In one embodiment, the inhibitor comprises a basic amine group through which the drug is conjugated by attachment of linker L via a carbamate group. These inhibitors include as examples veliparib, niraparib, rucaparib, and berzosertib (VX-970, VE-822). Such inhibitors result in linker-drugs of formula wherein Y is absent and D is attached through the basic nitrogen.

In another embodiment, the DNA damage response inhibitor does not comprise a basic amine group, but rather comprises an acylhydrazone, often in the form of a phthalazone (or phthalazin-1(2H)-one) or the related polycyclic 2,7,8,9-tetrahydro-3H-pyrido[4,3,2-de]phthalazin-3-one. These inhibitors may be conjugated by alkylation of the NH of the acylhydrazone using N-(chloromethyl)carbamates similar to those disclosed in U.S. Pat. No. 8,754,190 to provide a connecting group Y=N($R^8$)$CH_2$. These inhibitors include as examples talazoparib (TLZ, BMN673), olaparib, pamiparib, CEP-9722, and E7016. Such inhibitors result in linker-drugs of formula (II), wherein Y has the formula N($R^7$)$CH_2$. In some embodiments, Y has the formula N($R^7$)$CH_2$ and D is connected to linker L through an alkyl linkage to a non-basic nitrogen atom of D. In contrast with the thiol and phenol conjugates of U.S. Pat. No. 8,754,190, the $pK_a$ of a typical phthalazone is 12, necessitating $R^8$=H or optionally substituted $C_1$-$C_4$ alkyl to achieve appropriate rates of decomposition of the intermediate Mannich base Y-D resulting from beta-elimination. These linker-drugs may be prepared as described in the examples below by reaction of a (N-chloromethyl)-carbamate with the anionic form of the drug formed by reaction of the drug with a strong base, for example lithium diisopropylamide (LDA), or a metal hexamethyldisilazide such as sodium, lithium, or potassium HMDS. Non-alkylating guanidine bases may also be used, for example 7-methyl-1,5,7-triazabicyclo[4.4.0]dec-5-ene (MTBD). The N-(chloromethyl)carbamates may be prepared analogously to those described in U.S. Pat. No. 8,754,190, using linker-carbamates formed by the reaction of a linker chloroformate with an optionally substituted amine $R^7$—$NH_2$.

In certain embodiments, the DNA damage response inhibitor comprises both a basic and a non-basic nitrogen group, in which case the ultimate linker-drug obtained will depend upon the reaction conditions used to form the product. For example, talazoparib comprises both basic and non-basic nitrogens. While it is possible to acylate talazoparib with linker-chloroformates to provide linker-drugs of formula (II) wherein Y is absent, conjugates of these acylated talazoparibs were found to be susceptible to hydrolytic decomposition. Thus, for inhibitors of DDR comprising an acylhydrazone, compounds of formula (II) wherein Y=N($R^7$)$CH_2$ are preferred.

In one embodiment, the linker-drugs of formula (II) are connected to soluble macromolecular carriers M to provide conjugates. Suitable examples of M are synthetic polymers, for example polyethylene glycols, and natural polymers, for example dextrans, hyaluronic acids, and proteins such as random-sequence proteins and antibodies. As one function of M is to induce accumulation of the conjugated drug in tumor tissue according to the enhanced permeability and retention (EPR) effect, which relies upon the poorly developed lymphatic drainage to entrap nanoparticulates in rapidly growing tumor tissue. According to this mechanism, it is possible to emphasize delivery of antitumor drugs to tumor tissue and minimize drug exposure of non-tumor tissue, thus ameliorating undesired toxicities. As demonstrated in PCT Application PCT/US2019/13306 and PCT publication WO2019/140271, conjugates of hydrodynamic radius between 5 and 50 nm are expected to be particularly effective, with conjugates prepared using multi-arm polyethylene glycols of average molecular weight approximately 40,000 Dalton showing high accumulation and lifetimes in tumor tissues. In certain embodiments, M is a polyethylene glycol of average molecular weight between 20,000 and 60,000 Daltons, having a hydrodynamic radius between 5 and 50 nm. In some embodiments, y=1-4. Most preferably, M is a multi-arm polyethylene glycol having 4-8 arms (y=4-8) and an average molecular weight of approximately 40,000 Daltons. In some embodiments, M is a polyethylene glycol of average molecular weight between 1,000 and 100,000 Daltons. In some embodiments, M has a hydrodynamic radius between 5 and 50 nm. It is understood that large polymers such as polyethylene glycols, dextrans, hyaluronic acids, and the like are typically polydisperse; they comprise a mixture of species having a range of molecular weights about the average molecular weight due to a range in the number of monomer units present. Such polydispersity in monomer content (and thus molecular weight) is typically approximately ±15%, 10%, or 5% and does not impact the utility of the polymers for use in the present invention. Thus, when a polyethylene glycol of average molecular weight 40,000 is specified, this describes a polydisperse polymer of approximately 40,000±5,000 Daltons comprising individual polymers having 900±100 ethylene oxide units. In FIGS. 2 and 3, the illustrative structures show 4-armed polymers wherein each arm comprises z ethylene oxide monomer units; when the average molecular weight of the polymer is approximately 40,000 Daltons, z is 227±25.

In another embodiment, the linker-drugs of formula (II) are connected to insoluble carriers M to provide non-circulating conjugates. Suitable examples of insoluble M include hydrogel depots, either as bulk materials or as microparticulate suspensions such as microspheres. In this embodiment, as M is a crosslinked polymer of extremely high molecular weight, y is a multiplicity describing the concentration of linker-drugs attached to the insoluble M matrix. For example, when M is formed by crosslinking 4-armed polymers, 1, 2, 3, or 4 linker-drugs can be attached to each polymer-polymer unit. Thus, the desired multiplicity can be achieved by reacting the linker-drug with M in a suitable ratio. As such, suitable drug concentration on M can be achieved. Further, the density of polymer-polymer units in M may be varied by choice of the polymer molecular weight; for example, a hydrogel comprised of crosslinked 4-arm PEGs having average molecular weights of 20 kDa may allow up to 5 micromoles of attached drug per milliliter of hydrogel, whereas those comprised of 10 kDa PEGs may allow up to 10 micromoles of attached drug per milliliter of hydrogel. Typical values are between 0.1 and 50 micromoles of attached linker-drug per milliliter of hydrogel M, preferably between 0.1 and 10 micromoles per milliliter. In this embodiment, M preferably comprises degradable cros slinks that allow for clearance of the insoluble carrier after D has been released. Examples of such hydrogel materials and methods for the attachment of linker-drugs to them may be found, for example, in U.S. Pat. No. 9,649,385.

M is connected to the linker-drug through functional group Z*, which is formed by reaction of a group Z on the linker drug with a cognate group Z' on M. Typical examples of Z/Z' are where one is azide and the other an alkyne or cyclooctyne to give Z*=1,2,3-triazole; one is amine and the other carboxylic acid or active ester to give Z*=carboxamide; one is chloroformate or active carbonate and the other is an amine to give Z*=carbamate; one is alcohol, and the other is isocyanate to give Z*=carbamate; one is isocyanate and the other is amine to give Z*=urea; one is a ketone or aldehyde and the other aminooxy to give Z*=oxime; and where one is thiol and the other maleimide or halocarbonyl to give Z*=thioether. In certain embodiments, Z* is a triazole resulting from the cycloaddition of an azide with a cyclooctyne such as an azadibenzocyclooctyne (DBCO), a bicyclo[6.1.0]non-4-yne (BCN), or 5-hydroxy-cyclooctyne (5HCO). In some embodiments, provided is method of preparing a conjugated inhibitor of DNA damage response (e.g., a conjugate of formula (III)), the method comprising the step of contacting a linker-drug of formula (II) with an activated macromolecular carrier comprising a cognate functional group Z' capable of reacting with functional group Z under conditions such that connecting group Z* is formed, and optionally isolating the conjugate.

In some embodiments, the conjugate of formula (I) is a conjugate of formula (III),

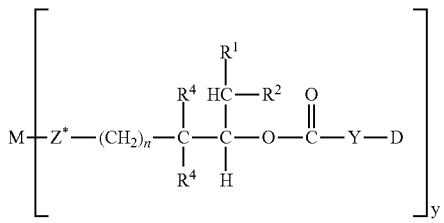

(III)

wherein M, Z*, D, n, R$^1$, R$^2$, R$^4$, Y, and y are as disclosed herein for formula (I) or (II). In some embodiments, Z* is a connecting group; n=0-6; R$^1$ and R$^2$ are each independently H, CN, or SO$_2$R$^5$, wherein R$^5$ is optionally substituted C$_1$-C$_6$ alkyl, optionally substituted aryl, optionally substituted heteroaryl, or N(R$^6$)$_2$, wherein each R$^6$ is independently optionally substituted C$_1$-C$_6$ alkyl, optionally substituted aryl, optionally substituted heteroaryl, or wherein N(R$^6$)$_2$ forms a ring of 4-8 atoms; each R$^4$ is independently H or C$_1$-C$_3$ alkyl or taken together form a 3-6 member ring; and Y is either absent or has the formula N(R$^7$)CH$_2$, wherein R$^7$ is optionally substituted C$_1$-C$_4$ alkyl or optionally substituted aryl; and wherein at least one of R$^1$ and R$^2$ is other than H. In some embodiments, n is 1-4 and R$^7$ is optionally substituted C$_1$-C$_4$ alkyl.

In some embodiments, the conjugate of formula (I) is a conjugate of formula (IV),

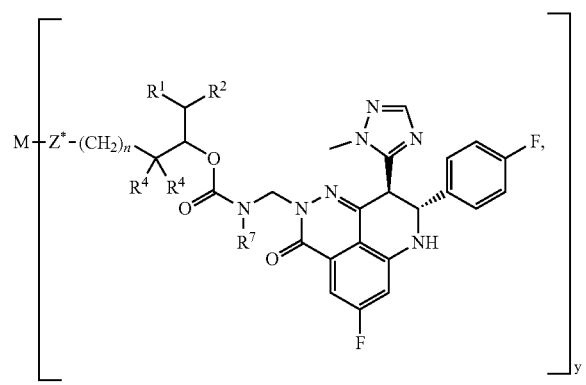

(IV)

wherein M, Z*, n, R$^1$, R$^2$, R$^4$, R$^7$, and y are as disclosed herein for formula (I) or (II). In some embodiments, M is a 40-kDa 4-armed PEG. In some embodiments, n is 4. In some embodiments, Z* is carboxamide, carbamate, oxime, thioether, or triazole. In some embodiments, y is 4. In some embodiments, M is a 40-kDa 4-armed PEG; n is 4; Z* is carboxamide, carbamate, oxime, thioether, or triazole; and y is 4. In some embodiments, M is a 40-kDa 4-armed PEG; n is 1; each R$^4$ is alkyl; R$^7$ is optionally substituted alkyl; Z* is carboxamide, carbamate, oxime, thioether, or triazole; and y is 4.

In some embodiments, the conjugate of formula (I) is a conjugate of formula (V),

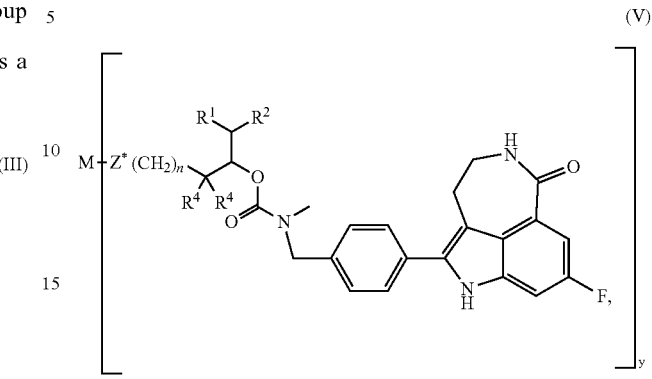

(V)

wherein M, Z*, n, R$^1$, R$^2$, R$^4$, and y are as disclosed herein for formula (I) or (II). In some embodiments, M is a 40-kDa 4-armed PEG. In some embodiments, n is 4. In some embodiments, Z* is carboxamide, carbamate, oxime, thioether, or triazole. In some embodiments, y is 4. In some embodiments, M is a 40-kDa 4-armed PEG; n is 4; Z* is carboxamide, carbamate, oxime, thioether, or triazole; and y is 4. In some embodiments, M is a 40-kDa 4-armed PEG; n is 1; each R$^4$ is alkyl; R$^7$ is optionally substituted alkyl; Z* is carboxamide, carbamate, oxime, thioether, or triazole; and y is 4.

In the descriptions herein, it is understood that every description, variation, embodiment or aspect of a moiety may be combined with every description, variation, embodiment or aspect of other moieties the same as if each and every combination of descriptions is specifically and individually listed. For example, every description, variation, embodiment or aspect provided herein with respect to M of formula (I) may be combined with every description, variation, embodiment or aspect of Z*, L, D, and y the same as if each and every combination were specifically and individually listed. It is also understood that all descriptions, variations, embodiments or aspects of any formulae such formula (I), (II), (III), or (IV), where applicable, apply equally to other formulae detailed herein, and are equally described, the same as if each and every description, variation, embodiment or aspect were separately and individually listed for all formulae. For example, all descriptions, variations, embodiments or aspects of formula (II), where applicable, apply equally to any of formulae as detailed herein, such as formula (I), (III), and (IV) and are equally described, the same as if each and every description, variation, embodiment or aspect were separately and individually listed for all formulae.

The conjugates of the invention may be formulated using standard methods known in the art. Optimum stability is typically observed in formulations of pH between 3 and 6, preferably between 4 and 5. Formulation buffers may optionally comprise excipients known in the art to control osmolarity, ionic strength, sterility, and stability. Formulations may be provided as aqueous solutions for injection or as lyophils for reconstitution.

The conjugates of the invention may be used to treat various diseases or conditions in a subject, either human or animal, in need of such treatment. In some embodiments, the disease is cancer. In some embodiments, the disease is breast, ovarian, or pancreatic cancer.

The utility of PARP inhibition in treating cancers in which genetic mutations result in deficiencies in the DNA damage response, a concept referred to as "synthetic lethality," is well-established (see, for example, Nijman, FEBS Letts 2011 Jan. 3; 585(1): 1-6 and references therein). Prominent examples of genetic mutations are those in the BRCA1, BRCA2, and PTEN genes that have been found to result in sensitivity to treatment with PARP inhibitors due to the increased reliance of such mutated cells on PARP for DNA damage repair. PARP inhibitors have found particular success in treatment of breast, ovarian, and pancreatic cancers in the context of such mutant genetic backgrounds (Zhu et al., Mol Cancer 19, 49 (2020). https://doi.org/10.1186/s12943-020-01167-9). As the conjugates of the invention provide long-term release and exposure to PARP inhibitors, they are also expected to be useful in treatment of cancers having such genetic deficiencies in DNA damage response.

PARP inhibitors have also been found to be effective when used in combination with other agents. Non-limiting examples of combination agents are: DNA damaging agents including camptothecins such as irinotecan, exatecan, SN-38, and conjugates of such agents as described, for example, in U.S. Pat. Nos. 7,462,627; 7,744,861; 8,906,353; 9,855,261; 10,653,689; 10,016,411; and 10,729,782 and PCT Publication WO2015/155976; temozolomide and other alkylating agents; immunotherapy agents including durvalumab, pembrolizumab, and ivolumab; kinase inhibitors including ATM, ATR, and AKT inhibitors such as ipatasertib, berzosertib, dactolisib, AZD6738, VE-821, and VE-822; antiangiogenic agents such as cediranib; androgen receptor ligands such as enzalutamide and abiraterone; and radiotherapy. See for example C. Pezaro, Ther Adv Med Oncol. 2020; 12: 1758835919897537. In the absence of genetic mutations, PARP inhibitors have been found to be effective in combination with epigenetic modifiers such as DNA methyltransferase inhibitors such as the dinucleoside antimetabolite guadecitabine (Pulliam et al., Clin Cancer Res. 2018; 24(13): 3163-75). It is similarly expected that the conjugates of the invention will find utility in the treatment of cancers in combination with such agents.

PARP inhibitors have shown activity against various neurodegenerative diseases, where excessive activation of PARP leads to a particular form of programmed cell death called PARthanatos (Wang et al., Sci Signal. 2011 Apr. 5; 4(167):ra20). Activity of PARP inhibitors in neurodegenerative diseases such as retinitis pigmentosa (Sahaboglu et al., Sci. Rep. 2016; 6:39537), glaucomatous retinopathy and optic retinopathy (U.S. Pat. No. 6,444,676), and Alzheimer's disease (Gao et al., J. Enzyme Inhibition and Med Chem 2019, 34:1, 150-162).

Administration of the conjugates may be by any route, including intravenous, intraperitoneal, intramuscular, subcutaneous, intracranial, and intravitreal.

Certain representative embodiments are provided below.

Embodiment 1. A Conjugate having the Formula

M-(Z*-L-D)$_y$ wherein M is a soluble macromolecular carrier;
y=1 to 8;
Z* is a connecting group;
L is a releasable linker; and
D is an inhibitor of the DNA damage response.

Embodiment 2. The conjugate of Embodiment 1 wherein D is a PARP inhibitor, ATM inhibitor, or ATR inhibitor.

Embodiment 3. The conjugate of Embodiment 1 having the formula

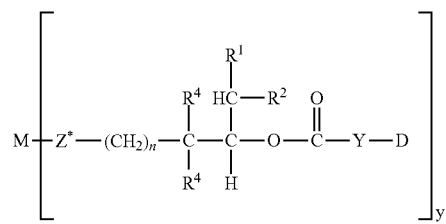

wherein Z* is a connecting group; n=1-4; $R^1$ and $R^2$ are each independently H, CN, or $SO_2R^5$, wherein $R^5$ is optionally substituted $C_1$-$C_6$ alkyl, optionally substituted aryl, optionally substituted heteroaryl, or $N(R^6)_2$, wherein each $R^6$ is independently optionally substituted $C_1$-$C_6$ alkyl, optionally substituted aryl, optionally substituted heteroaryl, or wherein $N(R^6)_2$ forms a ring of 4-8 atoms; each $R^4$ is independently H or $C_1$-$C_3$ alkyl or taken together form a 3-6 member ring; and Y is either absent or has the formula $N(R^7)CH_2$, wherein $R^7$ is optionally substituted $C_1$-$C_4$ alkyl; and wherein at least one of $R^1$ and $R^2$ is other than H.

Embodiment 4. The conjugate of Embodiment 3 wherein Y is absent and D is connected to linker L through a carbamate linkage to a primary or secondary amine nitrogen atom of D.

Embodiment 5. The conjugate of Embodiment 4 wherein D is rucaparib, veliparib, niraparib, or berzosertib.

Embodiment 6. The conjugate of Embodiment 3 wherein Y has the formula $N(R^7)CH_2$ and D is connected to linker L through an alkyl linkage to a non-basic nitrogen atom of D.

Embodiment 7. The conjugate of Embodiment 6 wherein D is talazoparib, olaparib, tamiparib, E7016, or CEP-9722.

Embodiment 8. The conjugate of Embodiment 1 wherein M is a PEG of molecular weight between 1000 and 100,000, and y=1-8.

Embodiment 9. The conjugate of Embodiment 1 where in M has a hydrodynamic radius between 5 and 50 nm.

Embodiment 10. The conjugate of Embodiment 1 wherein Z* is a carboxamide, carbamate, urea, oxime, thioether, or 1,2,3-triazole.

Embodiment 11. The conjugate of Embodiment 1 wherein $R^1$ and $R^2$ are selected to provide a half-life for D release between 100-1000 hours at pH 7.4, 37° C.

Embodiment 12. The conjugate of Embodiment 1 having the formula

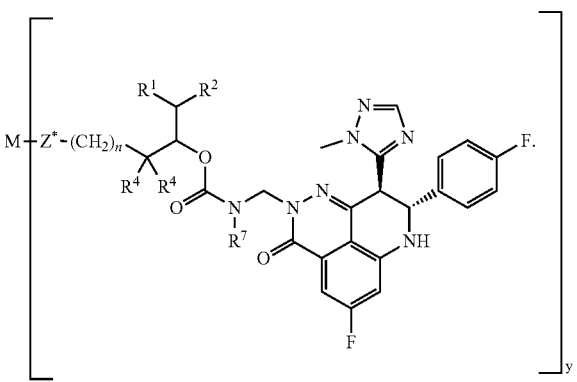

wherein M is a macromolecular carrier; n=1-4; Z* is a connecting group; $R^1$ and $R^2$ are each independently H, CN, or $SO_2R^5$, wherein $R^5$ is optionally substituted $C_1$-$C_6$ alkyl, optionally substituted aryl, optionally substituted heteroaryl, or $N(R^6)_2$, wherein each $R^6$ is independently optionally substituted $C_1$-$C_6$ alkyl, optionally substituted aryl, optionally substituted heteroaryl, or wherein $N(R^6)_2$ forms a ring of 4-8 atoms; each $R^4$ is independently H or $C_1$-$C_3$ alkyl or taken together form a 3-6 member ring; $R^7$ is optionally substituted $C_1$-$C_3$ alkyl; and y=1 to a multiplicity; and wherein at least one of $R^1$ and $R^2$ is other than H.

Embodiment 13. The conjugate of Embodiment 12 wherein M is a 40-kDa 4-armed PEG and y=4.

Embodiment 14. The conjugate of Embodiment 12 wherein M is a 40-kDa 4-armed PEG; n=4; Z* is carboxamide, carbamate, oxime, thioether, or triazole; and y=4.

Embodiment 15. The conjugate of Embodiment 1 having the formula

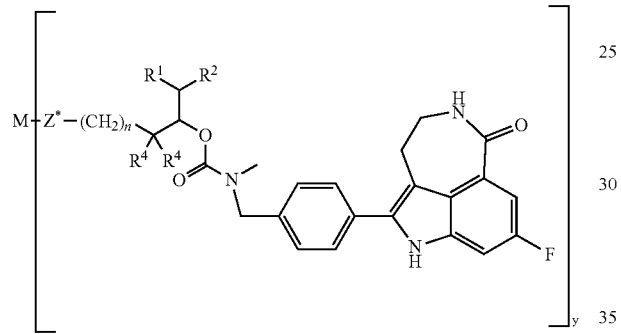

wherein M is a macromolecular carrier; n=1-4; Z* is a connecting group; $R^1$ and $R^2$ are each independently H, CN, or $SO_2R^5$, wherein $R^5$ is optionally substituted $C_1$-$C_6$ alkyl, optionally substituted aryl, optionally substituted heteroaryl, or $N(R^6)_2$, wherein each $R^6$ is independently optionally substituted $C_1$-$C_6$ alkyl, optionally substituted aryl, optionally substituted heteroaryl, or wherein $N(R^6)_2$ forms a ring of 4-8 atoms; each $R^4$ is independently H or $C_1$-$C_3$ alkyl or taken together form a 3-6 member ring; and y=1 to a multiplicity; and wherein at least one of $R^1$ and $R^2$ is other than H.

Embodiment 16. The conjugate of Embodiment 15 wherein M is a 40-kDa 4-armed PEG; n=4; Z* is carboxamide, carbamate, oxime, thioether, or triazole; and y=4.

Embodiment 17. A linker-drug of the formula

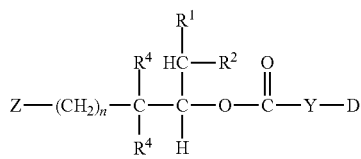

wherein Z is a connecting group; n=1-4; $R^1$ and $R^2$ are each independently H, CN, or $SO_2R^5$, wherein $R^5$ is optionally substituted $C_1$-$C_6$ alkyl, optionally substituted aryl, optionally substituted heteroaryl, or $N(R^6)_2$, wherein each $R^6$ is independently optionally substituted $C_1$-$C_6$ alkyl, optionally substituted aryl, optionally substituted heteroaryl, or wherein $N(R^6)_2$ forms a ring of 4-8 atoms; each $R^4$ is independently H or $C_1$-$C_3$ alkyl or taken together form a 3-6 member ring; Y is either absent or has the formula $N(R^7)CH_2$, wherein $R^7$ is optionally substituted $C_1$-$C_4$ alkyl; and D is an inhibitor of DNA damage response; and wherein at least one of $R^1$ and $R^2$ is other than H.

The following examples illustrate, but do not limit the invention.

Preparation A

Synthesis of Linker Alcohols, Chloroformates, and Succinimidyl Carbonates

Synthesis of certain linker alcohols, chloroformates, and succinimidyl carbonates has been previously described, for example in U.S. Pat. Nos. 8,680,315 and 8,754,190, and in Santi et al. (2012) *Proc Natl Acad Sci USA* 109: 6211-6. Additional linkers were prepared according to the following methods.

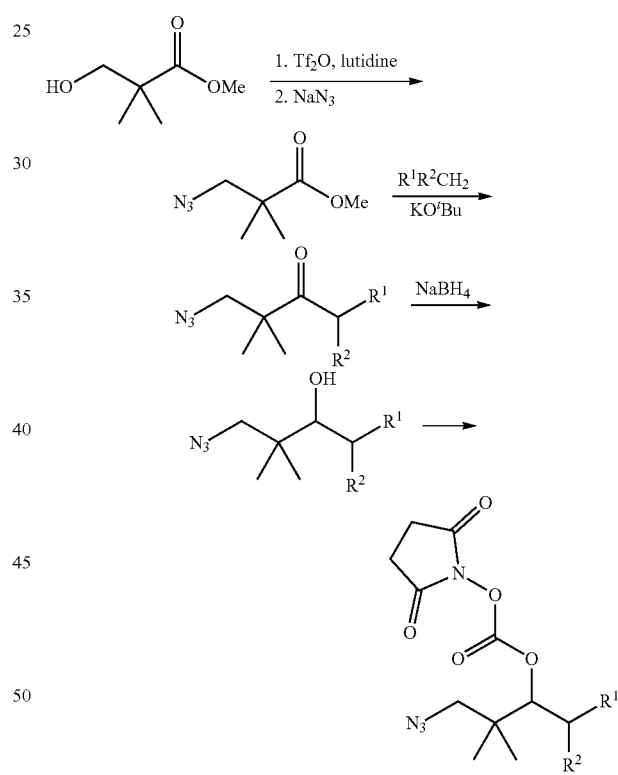

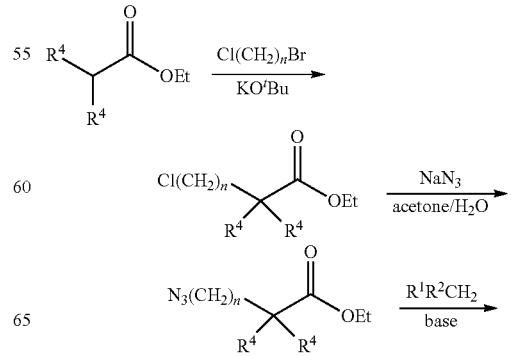

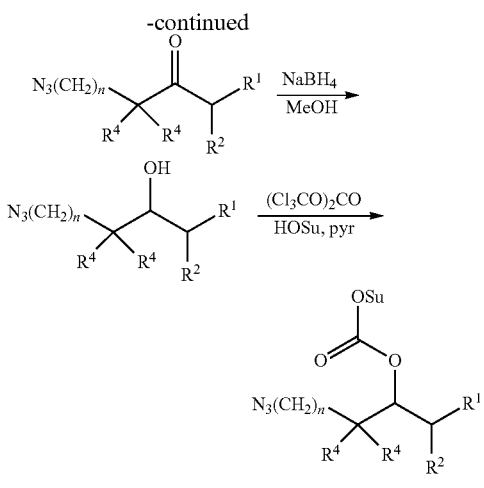

(1) 4-Azido-1-cyano-3,3-dimethyl-2-butanol (n=1, $R^1$=CN, $R^2$=H, $R^4$=$CH_3$, Z=$N_3$)

A 1 M solution of potassium tert-butoxide in THF (3.5 mL, 3.5 mmol) was added to a solution of methyl 3-azido-2,2-dimethylpropionate (prepared according to Kim, Synthetic Communications; 300 mg, 1.9 mmol) and acetonitrile (0.365 mL, 7.0 mmol) in 7 mL of THF at −30° C. The mixture was stirred for 30 min at −30° C., then allowed to warm to ambient temperature over 1 h and stirred for an additional 30 min. The mixture was cooled on ice and quenched by addition of 6 N HCl (0.62 mL, 3.7 mmol), then partitioned between EtOAc and water. The aqueous phase was extract 2× with EtOAc, and the combined organics were washed with brine, dried over MgSO$_4$, filtered, and concentrated to provide the crude ketone.

Sodium borohydride (33 mg, 0.88 mmol) was added to a solution of the crude ketone (300 mg, ca. 1.75 mmol) in 7 mL of methanol. The mixture was stirred for 15 min then quenched by addition of 6 N HCl (0.7 mL), and partitioned between EtOAc and water. The aqueous phase was extract 2× with EtOAc, and the combined organics were washed with brine, dried over MgSO$_4$, filtered, and concentrated to provide the crude alcohol. Purification on SiO$_2$ (20-40% EtOAc/hexane) provided 4-azido-1-cyano-3,3-dimethyl-2-butanol (142 mg, 0.85 mmol). $^1$H-NMR (CDCl$_3$, 300 MHz) d 3.83-3.92 (m, 1H), 3.43 (d, J=12.1 Hz, 1H), 3.21 (d, J=12.1 Hz, 1H), 2.41-2.62 (m, 3H), 0.97 (s, 3H), and 0.96 (s, 3H).

(2) 4-Azido-1-cyano-3,3-dimethyl-2-butyl chloroformate (n=1, $R^1$=CN, $R^2$=H, $R^4$=$CH_3$, Z=$N_3$)

Pyridine (136 uL, 1.7 mmol) was added dropwise to a solution of 4-azido-1-cyano-3,3-dimethyl-2-butanol (142 mg, 0.85 mmol) and triphosgene (425 mg, 1.44 mmol) in 8 mL of THF cooled on ice. The resulting suspension was allowed to warm to ambient temperature and stirred for 15 min, then filtered and concentrated to provide the chloroformate.

(3) 4-Azido-1-cyano-3,3-dimethyl-2-butyl succinimidyl carbonate (n=1, $R^1$=CN, $R^2$=H, $R^4$=$CH_3$, Z=$N_3$)

The chloroformate from above was dissolved in 8 mL of THF, cooled on ice, and treated with N-hydroxysuccinimide (291 mg, 2.5 mmol) and pyridine (204 uL, 2.53 mmol). The resulting suspension was allowed to warm to ambient temperature and stirred for 15 min, then partitioned between EtOAc and 5% KHSO$_4$. The aqueous phase was extract 2× with EtOAc, and the combined organics were washed with brine, dried over MgSO$_4$, filtered, and concentrated to provide the crude succinimidyl carbonate. Purification on SiO$_2$ (20-40% EtOAc/hexane) provided 4-azido-1-cyano-3,3-dimethyl-2-butyl succinimidyl carbonate (174 mg, 0.56 mmol). $^1$H-NMR (CDCl$_3$, 300 MHz) d 5.03 (dd, J=7.0, 5.1, 1H), 3.27-3.41 (m, 6H), 3.43 (d, J=12.1 Hz, 1H), 3.21 (d, J=12.1 Hz, 1H), 2.41-2.62 (m, 3H), 0.97 (s, 3H), and 0.96 (s, 3H).

Linkers wherein n=2-6 are prepared beginning with the corresponding homologated halo-esters as indicated.

5-Azido-1-cyano-3,3-dimethyl-2-pentyl succinimidyl carbonate (n=2, $R^1$=CN, $R^2$=H, $R^4$=$CH_3$, Z=$N_3$)

(a) Ethyl 4-chloro-2,2-dimethylbutanoate

A heat-gun dried, 500-mL, round-bottom flask equipped with a stir bar, rubber septum, nitrogen inlet, and thermocouple probe was charged with iPr2NH (5.30 mL, 37.4 mmol, 1.1 equiv, 0.27 M final concentration) and THF (100 mL). The reaction mixture was cooled at 0° C. while a solution of nBuLi (1.28 M in hexanes, 27.8 mL, 35.7 mmol, 1.05 equiv, 0.26 M final concentration) was added dropwise via syringe at a rate such that the internal temperature did not exceed +10° C. (~10 min). The reaction mixture was stirred at 0° C. for 15 min, cooled to −78° C. and a solution of ethyl isobutyrate (4.6 mL, 4.0 g, 34 mmol, 1.0 equiv, 0.24 M final concentration) in THF (5 mL) was added dropwise via syringe at a rate such that the internal temperature did not exceed −65° C. (~5 min). The reaction mixture was stirred at −78° C. for 45 min then a solution 1-bromo-2-chloro ethane (2.8 mL, 34 mmol, 1.0 equiv, 0.24 M final concentration) in THF (5 mL) was added at a rate such that the internal temperature did not exceed −68° C. The reaction mixture was stirred at −78° C. for 15 min, allowed to warm to 0° C., and stirred at 0° C. for 15 min. The reaction mixture was diluted with EtOAc (100 mL) and 5% KHSO$_4$ (100 mL). The aqueous phase was separated and extracted with EtOAc (3×50 mL). The aqueous phase was separated and extracted with EtOAc (3×50 mL). The combined organic phases were washed with brine, dried over MgSO$_4$, filtered, and concentrated from toluene (10 mL×2) to afford 4.85 g (27 mmol, 79%) of desired chloride as a pale yellow oil:

$^1$H NMR (CDCl$_3$, 300 MHz) δ 4.14 (q, J=7.2 Hz, 2H), 3.43-3.57 (m, 2H), 1.94-2.19 (m, 2H), 1.27 (t, J=7.1 Hz, 3H), 1.22 (s, 6H)

(b) Ethyl 4-azido-2,2-dimethylbutanoate

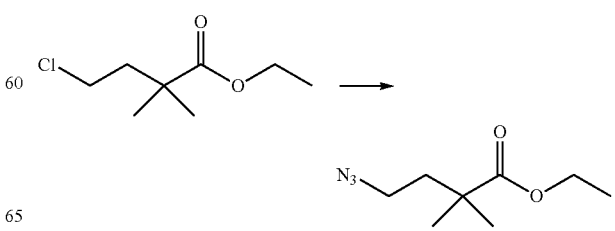

A 100-mL, round-bottomed flask equipped stir bar, rubber septum, and nitrogen inlet was charged with ethyl 4-chloro-2,2-dimethylbutanoate (2-1) (4.85 g, 27 mmol, 1.0 equiv, 0.54 M final concentration), DMSO (50 mL), and sodium azide (2.28 g, 35 mmol, 1.3 equiv, 0.70 M). The reaction mixture was stirred behind a blast shield at 70° C. for 18 h. The reaction mixture was cooled to ambient temperature and was diluted with EtOAc (200 mL) and H$_2$O (100 mL). The organic phase was separated, washed with H$_2$O (3×100 mL) and brine (100 mL), dried over MgSO$_4$, filtered, and concentrated. Purification via column chromatography (40 g silica gel cartridge; stepwise gradient elution: 0%, 5%, 10%, 20% EtOAc/hexanes) afforded 4.33 g (23.3 mmol, 87%) the desired azide as a pale yellow oil.

$^1$H NMR (CDCl$_3$, 300 MHz) δ 4.15 (q, J=7.1 Hz, 2H), 3.22-3.35 (m, 2H), 1.81-1.96 (m, 2H), 1.27 (t, J=7.2 Hz, 3H), 1.15-1.24 (m, 6H)

(c) 5-azido-1-(methylsulfonyl)-3,3-dimethyl-2-pentanone

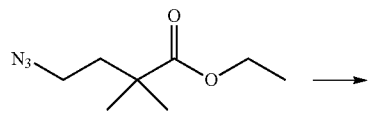

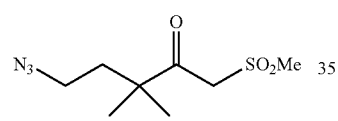

A 500-mL, 3 necked round bottomed flask equipped with a stir bar, three rubber septa, thermocouple probe and nitrogen inlet needle was charged with dimethylsulfone (5.59 g, 59.4 mmol, 2.2 equiv, 0.42 M final concentration) and THF (100 mL). The mixture was stirred at ambient temperature for 15 min, then cool at 0° C. while a solution of n-BuLi (42 mL, 54 mmol, 2.0 equiv, 0.39 M final concentration) was added dropwise at a rate such that the internal temperature did not exceed +5° C. (addition required ~10 min). The reaction mixture was stirred at 0° C. for 15 min, then cooled at −78° C. while a solution of the ester (5.0 g, 27.0 mmol, 1.0 equiv, 0.19 M final concentration) in THF (10 mL) was added dropwise via cannula at a rate such that the internal temperature did not exceed −70° C. (addition required ~5 min). The reaction mixture was stirred at −78° C. for 10 min, allowed to warm to 0° C. (bath removed), and stirred at 0° C. for 30 min. Reaction progress was analyzed by TLC and showed conversion of starting material to a more polar product. The reaction mixture was cooled at 0° C. while 1 M HCl added and the reaction mixture was further diluted with H$_2$O (100 mL) and EtOAc (200 mL). The aqueous phase was separated and extracted with EtOAc (3×100 mL). The combined organic phases were washed with brine, dried over MgSO$_4$, filtered, and concentrated to afford a yellow oil. Purification via column chromatography (120 g silica gel cartridge; stepwise gradient elution 30%, 40%, 50% EtOAc/hexanes) afforded 3.49 g (15.0 mmol, 55% yield) of the desired product as a white solid.

(d) 5-azido-1-(methylsulfonyl)-3,3-dimethyl-2-pentanol

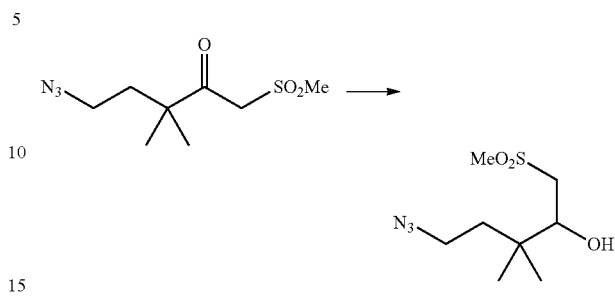

A 200-mL, recovery flask equipped with a rubber septum, stir bar, and nitrogen inlet was charged with 5-azido-1-(methylsulfonyl)-3,3-dimethyl-2-pentanone (3.44 g, 14.8 mmol, 1.0 equiv, 0.25 M final concentration) and methanol (60 mL). The solution was cooled at 0° C. while NaBH$_4$ (279 mg, 7.37 mmol, 0.5 equiv, 0.12 M final concentration) was added as a solid in small portions. The reaction mixture was stirred at 0° C. for 30 min. The reaction mixture was diluted with ethyl acetate (EtOAc) (100 mL), 5% KHSO$_4$ (100 mL), and water (100 mL). The aqueous phase was separated and extracted with EtOAc (3×100 mL). The combined organic phases were washed with brine, dried over MgSO$_4$, filtered, and concentrated to afford a while semi-solid. Purification via column chromatography (120 g silica gel cartridge; stepwise gradient elution: 40%, 50% EtOAc/hexanes) afforded 3.4 g (13.7 mmol, 93% yield) of the desired alcohol as a white solid.

(e) 5-azido-1-(methylsulfonyl)-3,3-dimethyl-2-pentyl succinimidyl carbonate

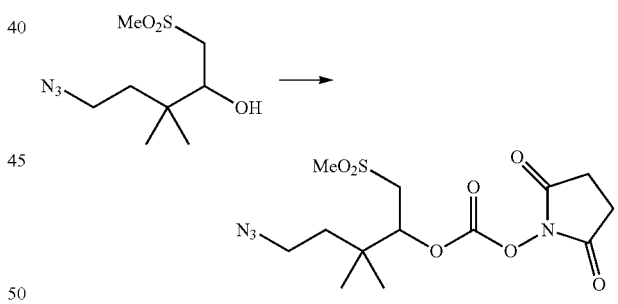

A 100-mL, round-bottomed flask equipped with a stir bar, rubber septum, and nitrogen inlet was charged with the 5-azido-1-(methylsulfonyl)-3,3-dimethyl-2-pentanol (2.00 g, 8.50 mmol, 1.0 equiv, 0.25 M final concentration), DCM (35 mL), and triphosgene (0.93 g, 3.1 mmol, 0.37 equiv) and cooled at 0° C. Pyridine (0.72 mL, 8.9 mmol) was added dropwise via syringe and the reaction mixture was stirred at 0° C. for 5 min, allowed to warm to ambient temperature over 10 min, and stirred at ambient temperature for 45 min. Reaction progress was monitored by TLC and showed complete conversion to the chloroformate. N-hydroxysuccinimide (1.17 g, 10.2 mmol, 1.2 equiv) was added as a solid in a single portion followed by dropwise addition of pyridine (0.82 mL, 10.20 mmol, 1.2 equiv). The reaction mixture was stirred at ambient temperature for 30 min. Reaction progress was monitored by TLC and showed complete conversion of the chloroformate to the desired succinimidyl carbonate. The reaction mixture was diluted with dichloromethane (DCM) (30 mL) and 5% KHSO₄ (30 mL). The aqueous phase was extracted with DCM (2×30 mL). The combined organic phases were washed with satd NaHCO₃ (30 mL) and brine (30 mL), dried over MgSO₄, filtered, and concentrated. Purification via column chromatography (80 g, silica gel cartridge, stepwise gradient 40, 50, 60% EtOAc/hexanes) afforded 2.36 g (6.27 mmol, 74% yield) of the desired succinimidyl carbonate as a colorless oil.

Additional alcohol and the chloroformates and succinimidyl carbonate compounds prepared therefrom according to these procedures include those wherein n=1-3, $R^2$=H, each $R^4$=Me, and $R^1$=MeSO₂, PhSO₂, (4-chlorophenyl)SO₂, (4-methylphenyl)SO₂, isopropyl-SO₂, N,N-dimethylamino-SO₂, (4-methylpiperidinyl)SO₂, morpholino-SO₂, thiomorpholino-SO₂, N-ethyl-N-methylamino-SO₂, and N,N-bis(2-methoxyethyl)amino-SO₂.

Example 1

Synthesis of PEG-Talazoparib Conjugates with $R^7$=Substituted Alkyl

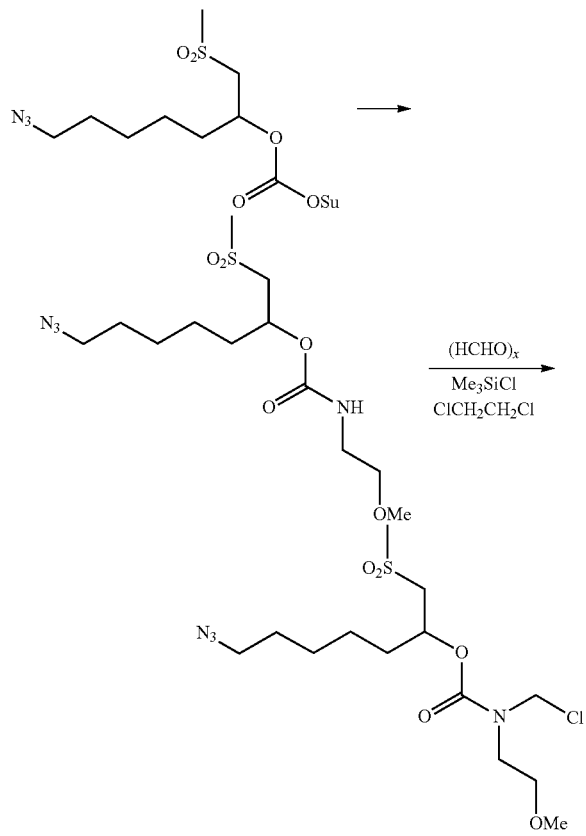

The synthesis of PEG-talazoparib conjugates is illustrated by the preparation of a conjugate wherein $R^1$=MeSO₂, $R^2$ and each $R^4$ is H, n=4, $R^7$ is 2-methoxyethyl, and Z* is a triazole. Analogous conjugates having different $R^1$ or other groups may be prepared according to the same methods beginning with the appropriate chloroformate or succinimidyl carbonate (Preparation A).

Synthesis of N-(chloromethyl)carbamate. A 20-mL scintillation vial equipped with stir bar and screw cap was charged with 7-azido-1-(methylsulfonyl)-2-heptyl succinimidyl carbonate (560 mg, 1.49 mmol, 1.0 equiv, 0.23 M final concentration) (Santi et al., 2012 *Proc Natl Acad Sci USA* 109: 6211-6), MeCN (6 mL), methoxy ethylamine (143 µL, 1.64 mmol, 1.1 equiv, 0.25 M final concentration), and iPr₂NEt (0.39 mL, 2.29 mmol, 1.5 equiv, 0.35 M final concentration). The reaction mixture was stirred at ambient temperature for 30 min. The reaction mixture was diluted with EtOAc (30 mL) and 5% aq KHSO₄ (30 mL). The aqueous phase was separated and extracted with EtOAc (3×30 mL). The combined organic phases were washed with brine (30 mL), dried over MgSO₄, filtered, and concentrated. Purification via column chromatography (80 SiO₂; step-wise gradient elution: 50%, 60%, 70%, 100% EtOAc/hexanes) afforded 318 mg (0.948 mmol, 63%) of carbamate as a colorless oil. ¹H NMR (CDCl₃, 300 MHz) δ 5.14-5.23 (m, 1H), 5.04-5.13 (m, 1H), 3.43-3.50 (m, 2H), 3.32-3.41 (m, 6H), 3.28 (t, J=6.8 Hz, 2H), 3.15 (m, J=4.9 Hz, 1H), 3.00 (s, 3H), 1.78 (br. s., 2H), 1.51-1.69 (m, 2H), 1.42 (d, J=4.3 Hz, 4H). LCMS (ESI) m/z [M+Na]⁺ calcd for $C_{12}H_{24}N_4O_{5S}$: 337.2; found: 337.1.

A 20 mL scintillation vial equipped with a stir bar and screw cap was charged with carbamate (150 mg, 0.445 mmol, 1.0 equiv, 0.1 M final concentration), 1,2-dichloroethane (4.5 mL), paraformaldehyde (27 mg, 0.892 mmol, 2 equiv, 0.2 M), and TMSCl (0.23 mL, 1.8 mmol, 4 equiv, 0.40 M). The reaction mixture was heated at 50° C. for 24 h. Reaction progress was monitored by C18 HPLC (ELSD, 0-100% B) and showed the starting material ($R_T$=8.92 min) convert to a less polar product ($R_T$=10.89 min). The reaction mixture was allowed to cool to ambient temperature, filtered, concentrated, and dissolved in 50% EtOAc/hexanes (10 mL). The resulting cloudy solution was filtered through a 0.2 µm syringe filter and the resulting filtrate was concentrated to afford 175 mg (ca. 0.45 mmol, quant yield). The product N-(chloromethyl)carbamate was immediately dissolved in THF (1.8 mL) and used without further purification.

The N-(chloromethyl)carbamate wherein Z=azide, n=2, $R^1$=MeSO₂, $R^2$=H, each $R^4$=Me, and Y=N($R^7$)CH₂ where $R^7$=2-methoxyethyl, was similarly prepared starting from the corresponding linker succinimidyl carbonate of Preparation A. A 25-mL round-bottomed flask equipped with a stir bar, rubber septum, and nitrogen inlet was charged with succinimidyl carbonate (1.0 g, 2.7 mmol, 1.0 equiv, 0.23 M final concentration), acetonitrile (10.8 mL), and methoxyethyl amine (0.28 mL, 3.2 mmol, 1.2 equiv). The reaction mixture was stirred at ambient temperature while iPr2NEt (0.71 mL, 4.1 mmol, 1.5 equiv) was added dropwise via syringe. The reaction mixture was stirred at ambient temperature for 30 min. TLC analysis showed complete conversion of the carbonate to a new product. The reaction mixture was diluted with EtOAc (30 mL) and 5% KHSO₄ (20 mL). The aqueous phase was separated and extracted with EtOAc (3×20 mL). The combined organic phases were washed with brine, dried over MgSO₄, filtered, and concentrated. Purification via column chromatography (40 g silica gel; stepwise gradient elution with 40, 50, 80% EtOAc/hexanes) afforded 828 mg (2.71 mmol, 91% yield) of the desired product as a colorless oil. A 20-mL scintillation vial equipped with a stir bar and screw cap was charged with the carbamate (153 mg, 0.45 mmol, 1.0 equiv, 0.10 M final concentration), DCE (4.5 mL), paraformaldehyde (55 mg, 1.82 mmol, 4.0 equiv), and TMSCl (230 µL, 1.82 mmol, 4 equiv). The vial was sealed with a plastic screw cap and the reaction mixture was heated at 50° C. for 24 h. Reaction progress was monitored by C18 HPLC/ELSD (0-100% B) of an aliquot of the reaction mixture (2 μL) diluted into 5 mM iPr2NEt in butanol (200 μL), and showed complete conversion of carbamate ($R_T$=8.56 min) to a less polar product (RT=10.64 min). The reaction mixture was allowed to cool to ambient temperature, filtered through a cotton plug, concentrated, redissolved in 50% EtOAc/hexanes (5 mL), filtered, and concentrated to a pale yellow oil. The crude product was dissolved in THF and used immediately without further purification.

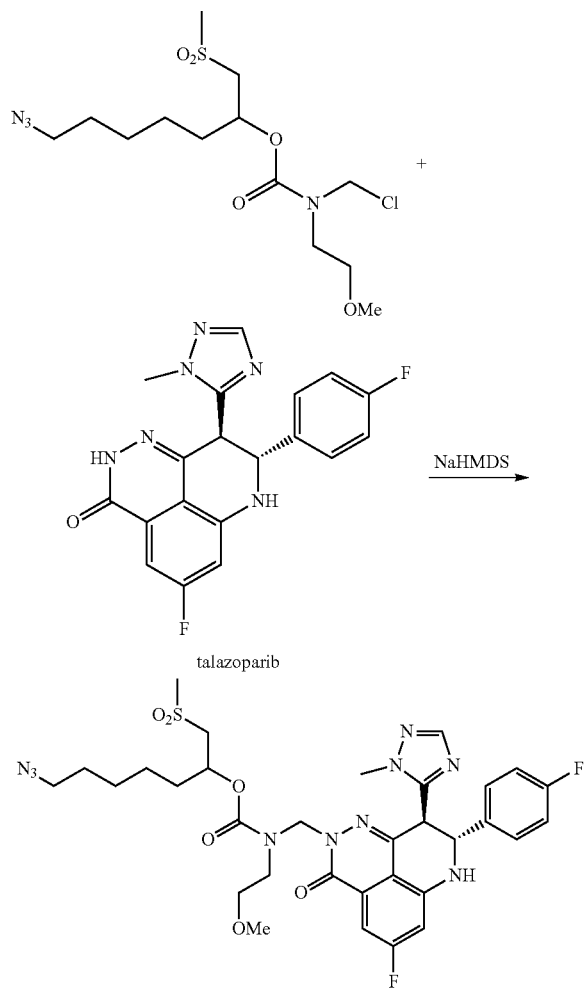

talazoparib

Synthesis of releasable linker-talazoparib (Formula (II) wherein D=talazoparib). A 10-mL, heat-gun dried, round-bottomed flask equipped with a stir bar, rubber septum, and nitrogen inlet needle was charged with talazoparib (100 mg, 0.263 mmol, 1.0 equiv, 65 mM final concentration) and THF (2.5 mL). The solution was cooled at −78° C. while a solution of NaHMDS (1 M in THF, 0.26 mL, 0.263 mmol, 1.0 equiv, 65 mM final concentration) was added slowly dropwise via syringe. The reaction mixture was stirred at −78° C. for 5 min then a solution of N-(chloromethyl) carbamate (0.26 M in THF, 1.3 mL, 0.342 mmol, 1.3 equiv, 84 mM final concentration) was added dropwise via syringe. The reaction mixture was stirred at −78° C. for 15 min, allowed to warm to 0° C. over 15 min, and stirred at 0° C. for 30 min. Reaction progress was monitored by C18 HPLC (0-100% B, 310 nm) and showed talazoparib ($R_T$=8.55 min) converting to a less polar product ($R_T$=10.67 min). The reaction mixture was diluted with EtOAc (10 mL) and 10% citric acid (10 mL). The aqueous phase was separated and extracted with EtOAc (3×10 mL). The combined organic phases were washed with brine (10 mL), dried over MgSO$_4$, filtered, and concentrated to afford a yellow residue. Purification by C18 preparative HPLC (35-70% B no TFA) afforded 95 mg (0.130 mmol, 50%) of the desired product (linker-drug of Formula (II) wherein Z=azide, n=4, $R^1$=MeSO$_2$, $R^2$ and each $R^4$=H, Y=N($R^7$)CH$_2$, $R^7$=2-methoxyethyl, and D=talazoparib) as a white solid. LCMS (ESI) m/z [M+H]$^+$ calcd for $C_{32}H_{38}F_2N_{10}O_6S$: 729.3; found: 729.2 C18 HPLC was monitored at 310 nm: 91% (0-100% B, $R_T$=9.95 min). The regiochemistry of alkylation was determined by 2D-NMR correlations.

Releasable linker-talazoparib (Formula (II) wherein D=talazoparib) was also prepared according to procedure provided below. A 10-mL, heat-gun dried, round-bottomed flask equipped with a stir bar, rubber septum, nitrogen inlet needle, and thermocouple probe was charged with TLZ (100 mg, 0.263 mmol, 1.0 equiv, 0.1 M final concentration) and THF (2.6 mL). The mixture was cooled at −78° C. while a solution of NaHMDS (1 M in THF, 0.26 mL. 0.26 mmol, 1.0 equiv, 0.1 M final concentration) was added dropwise such that the internal temperature did not rise above −72° C. (over approximately 2 min). The reaction mixture was stirred at −78° C. for 5 min then a solution of linker chloromethyl carbamate (0.5 M in THF, 0.68 mL, 0.34 mmol, 1.3 equiv, 0.1 M final concentration) was added dropwise at a rate such that the internal temperature did not rise above −72° C. The reaction mixture was stirred at −78° C. for 5 min, allowed to warm to 0° C. over 15 min, and stirred at 0° C. for 1 h. Reaction progress was monitored by C18 HPLC (0-100% over 10 min, 310 nm) and showed TLZ ($R_T$=8.43 min) converting to a less polar product ($R_T$=7.64 min). The reaction mixture was then cooled to −78° C. and 0.1 M Tris (pH 7.5, 3 mL) was added slowly such that the internal temperature did not exceed −50° C. The resulting mixture was allowed to warm to ambient temperature (cold bath removed) with vigorous stirring once possible (aqueous layer has to thaw). The mixture was then partitioned between EtOAc (30 mL) and 0.1 M Tris (pH 7.5, 30 mL). The organic layer was separated and extracted with EtOAc (3×30 mL). The combined organic phases were washed with brine, dried over MgSO$_4$, filtered, and concentrated to afford a yellow oil. Purification via preparative C18 HPLC (35-70% B over 15 min, 310 nm) afforded 90 mg (0.141 mmol, 54% yield) of the desired conjugate as a yellow glassy oil.

Using a similar method, the linker-drug of Formula (II) wherein Z=azide, n=2, $R^1$=MeSO$_2$, $R^2$=H, each $R^4$=Me, Y=N($R^7$)CH$_2$, $R^7$=2-methoxyethyl, and D=talazoparib was prepared. A 4-mL vial equipped with a stir bar, septum screw cap, and nitrogen inlet was charged with TLZ (22 mg, 0.06 mmol, 1 equiv, 50 mM final concentration) and THF (0.6 mL). The guanidine base 7-methyl-1,5,7-triazabicyclo [4.4.0]dec-5-ene (MTBD) (11 μL, 0.080 mmol, 1.3 equiv) was added and the reaction mixture was stirred for 1-2 min before adding a solution of chloromethyl carbamate (100 mM in THF (0.78 mL, 0.080 mmol, 1.3 equiv). The reaction mixture was stirred at ambient temperature for 1 h. Reaction progress was monitored by C18 HPLC on reaction aliquots (2 μL) quench by dilution into 5 mM iPr$_2$NEt in butanol (200 μL). HPLC analysis showed TLZ (RT=8.53 min) converting to a less polar product (10.07 min) with about 53% total conversion (5% change between 15 min and 1 h conversion). The reaction mixture was cooled at −78 C and 2 mL of 0.1 N Tris (pH 7.5) was added dropwise. The resulting mixture was allowed to warm to ambient temperature with vigorous stirring once possible. The reaction mixture was diluted with EtOAc (10 mL) and 0.1 N Tris (pH 7.5) (10 mL). The aqueous phase was separated and extracted with EtOAc (3×5 mL). The combined organic phases were dried over MgSO$_4$, filtered, and concentrated. Purification via preparative HPLC (35-70% B no TFA) afforded 14 mg (0.02 mmol, 32% yield) of the desired linker-TLZ. Purity was measured by C18 HPLC monitored at 310 nm: 98% (0-100% B, R$_T$=10.00 min).

Using the same methods, additional linker drugs of Formula (II) were prepared wherein:

Z=azide, n=4, R$^1$=MeSO$_2$, R$^2$=H, each R$^4$=H, Y=N(R$^7$)CH$_2$, R$^7$=2-methoxyethyl, and D=olaparib;

Z=azide, n=4, R$^1$=MeSO$_2$, R$^2$=H, each R$^4$=H, Y=N(R$^7$)CH$_2$, R$^7$=4-(N,N-diethylcarboxamido)phenyl, and D=talazoparib;

Z=azide, n=2, R$^1$=thiomorpholine-SO$_2$, R$^2$=H, each R$^4$=Me, Y=N(R$^7$)CH$_2$, R$^7$=2-methoxyethyl, and D=talazoparib.

Synthesis of releasable PEG-talazoparib conjugate. A 20 mL scintillation vial was charged with a solution of PEG$_{40kDa}$-[5HCO]$_4$ (24.5 mM in MeCN, 4.1 mL, 0.1 mmol, 1.0 equiv, 25 mM final concentration) and azido-linker-talazoparib of Formula (II) wherein wherein Z=azide, n=4, R$^1$=MeSO$_2$, R$^2$ and each R$^4$=H, Y=N(R$^7$)CH$_2$, R$^7$=2-methoxyethyl, and D=talazoparib (95 mg, 0.130 mmol, 1.3 equiv, 32 mM final concentration). The reaction mixture was heated at 37° C. for 24 h. Reaction progress was monitored by C18 HPLC (0-100% B, 310 nm) and showed linker-talazoparib (R$_T$=9.95 min) converting to a more polar product (R$_T$=9.17 min). The reaction mixture was then dialyzed (12,000-14,000 MWCO) against 400 mL MeOH for 18 h. The retentate was concentrated, redissolved in THF (10 mL), and precipitated by slow addition to vigorously stirring MTBE (100 mL). The resulting solids were collected by vacuum filtration on a sintered glass funnel, washed with MTBE (3×100 mL), and dried under high vacuum to afford 700 mg (0.064 mmol TLZ, 64% yield) of PEG conjugate as a colorless residue. C18 HPLC was monitored at 310 nm: 90% (0-100% B, R$_T$=9.17 min).

A sample of the releasable PEG-TLZ conjugate prepared according to the procedures provided above was dissolved in buffer at either pH 9.0 or 9.4 and kept at 37° C. HPLC analysis indicated that free talazoparib was released with half-lives of 3.40 and 1.69 h, respectively, estimating a half-life at pH 7.4 of 168-135 h. In contrast, an analogous stable conjugate (R$^1$ is H) showed no release of free talazoparib at pH 5.0, 7.4, or 9.4 over 18 hours.

Figure 8:
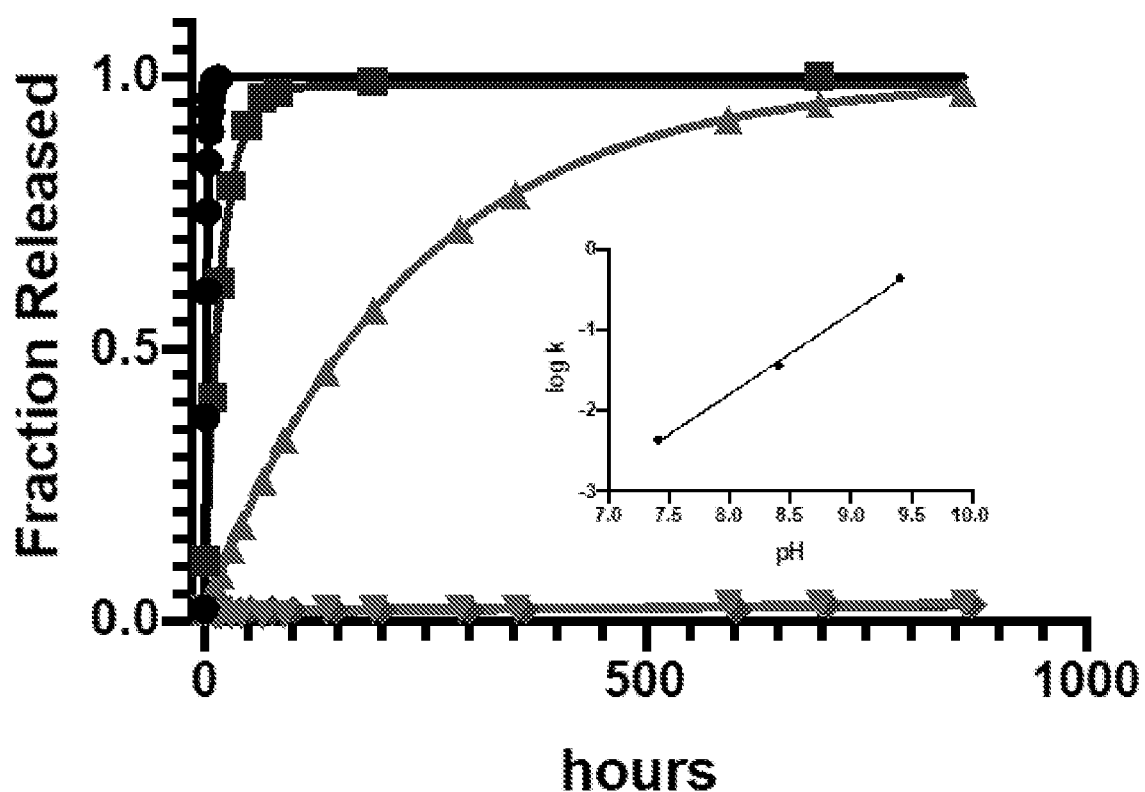
FIG. 8 shows the stability of a releasable PEG-talazoparib conjugate at pH 9.4 (●), 8.4 (■), 7.4 (▲), 5.0 (▼), and pH 1.1 (♦).

Solutions of the releasable PEG-TLZ conjugate prepared according to the procedures provided above (Formula (III) wherein Z*=triazole, n=4, R$^1$=MeSO$_2$, R$^2$ and each R$^4$=H, Y=N(R$^7$)CH$_2$, R$^7$=2-methoxyethyl, y=4, and D=talazoparib) were heated at 37° C. in buffered at pH 9.4, 8.4, 7.4, 5.0, and pH 1.1. The amount of released TLZ fraction was measured in each solution and the results are shown in FIG. 8. Hydroxide catalyzed release was observed over pH 7.4 to 9.4. The inset shows a pH-log$_{obsd}$ plot for TLZ release with m=1.00, R$^2$=0.9980.

The analogous conjugate of Formula (III) wherein Z*=triazole, n=2, R$^1$=MeSO$_2$, R$^2$=H, each R$^4$=Me, Y=N(R$^7$)CH$_2$, R$^7$=2-methoxyethyl, y=1, and D=talazoparib was similarly prepared using 20-kDa PEG-DBCO and released talazoparib with a half-life corresponding to 300 h at pH 7.4.

Example 2

Preparation and Stability Study of Acylated Talazoparib Conjugates

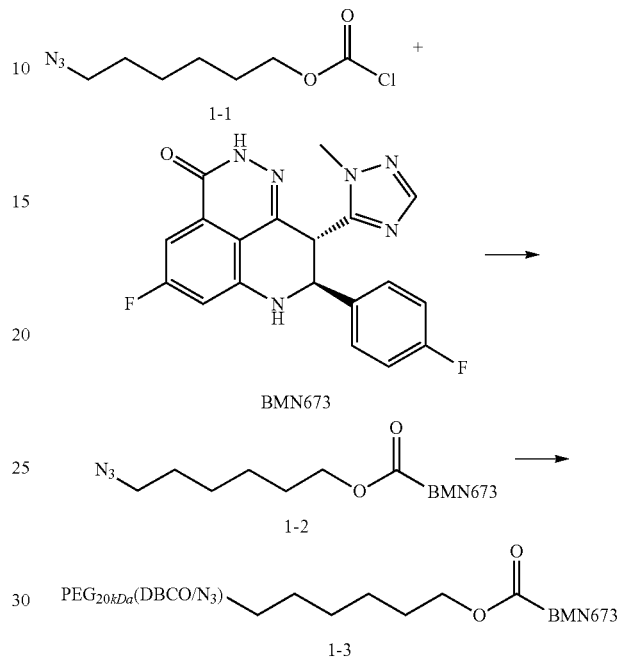

"Non-releasable" PEG-Talazoparib by acylation. A 10-mL, heat-gun dried, round-bottomed flask equipped with a stir bar, rubber septum, and nitrogen inlet was charged with talazoparib (15 mg, 39 μmol, 1.0 equiv) and THF (1 mL) and then cooled to −78° C. A solution of NaHMDS (1.0 M in THF, 39 μL, 39 μmol, 1.0 equiv) was added dropwise via syringe and the reaction mixture was stirred at −78° C. for 5 min. A solution of linker chloroformate 1-1 (0.5 M in THF, 94 μL, 47 μmol, 1.2 equiv) was added dropwise via syringe and the reaction mixture was stirred at − 78° C. for 5 min, allowed to warm to 0° C. over 20 min, and stirred at 0° C. for 45 min. Reaction progress was monitored by C18 HPLC (0-100% B, 310 nm) and showed conversion of talazoparib (R$_T$=8.36 min) to a less polar product (R$_T$=10.78 min). The reaction mixture was partitioned between EtOAc (10 mL) and 10% citric acid (10 mL). The aqueous phase was separated and extracted with EtOAc (3×10 mL). The combined organic phases were washed with brine, dried over MgSO$_4$, filtered, and concentrated. This crude product was dissolved in MeCN (2 mL) and used without further purification. LCMS (ESI) m/z [M+H]$^+$ calcd for C$_{26}$H$_{25}$F$_2$N$_9$O$_3$: 550.2; found: 550.1. C18 HPLC was monitored at 310 nm: 90% (10% TLZ; 0-100% B, R$_T$=10.78 min)

A 1.5-mL centrifuge tube was charged with a solution of PEG$_{20kDa}$-DBCO (4.4 mM, 1.0 mL, 4.4 μmol, 1.0 equiv) and a solution of the above stable linker-talazoparib (23 mM in MeCN, 240 μL, 5.5 μmol, 1.3 equiv). The reaction mixture was heated at 37° C. for 1 h. Reaction progress was monitored by C18 HPLC (0-100% B, 310 nm) and showed N$_3$-L(St)-talazoparib (R$_T$=10.78 min) and PEG-DBCO (R$_T$=9.20 min) converting to a product of intermediate polarity (R$_T$=9.36 min). The reaction mixture was cooled to ambient temperature and dialyzed (12,000-14,000 MWCO)

against 400 mL of MeOH for 24 h. The retentate was concentrated to a yellow residue and dissolved in MeCN (2 mL). C18 HPLC was monitored at 310 nm: 83% (0-100% B, $R_T$=9.36 min).

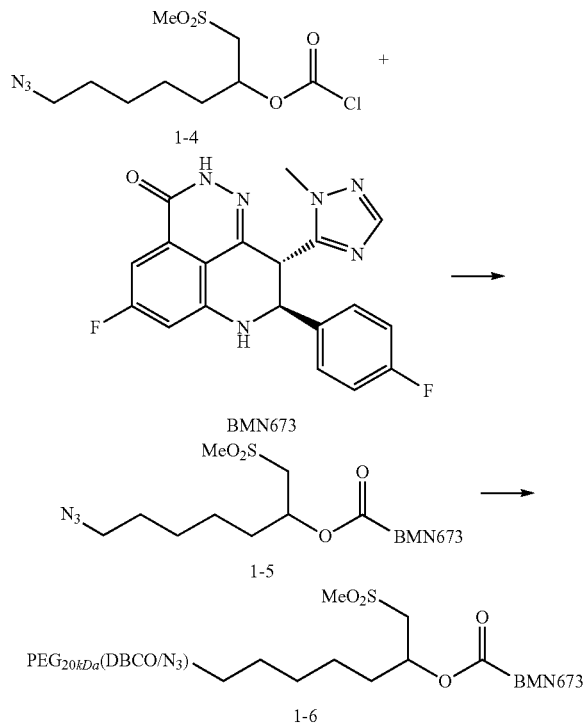

"Releasable" PEG-Talazoparib by acylation. A 10-mL, heat-gun dried, round-bottomed flask equipped with a stir bar, rubber septum, and nitrogen inlet was charged with talazoparib (8 mg, 20 μmol, 1.0 equiv) and THF (1 mL) and then cooled to −78° C. A solution of NaHMDS (1.0 M in THF, 21 μL, 21 μmol, 1.0 equiv) was added via syringe and the reaction mixture was stirred at −78° C. for 10 min. A solution of linker chloroformate 1-4 (400 mM in THF, 63 μL, 25 μmol, 1.2 equiv) was added dropwise via syringe and the reaction mixture was stirred at −78° C. for 5 min, allowed to warm to 0° C. over 20 min, and stirred at 0° C. for 45 min. The reaction mixture was partitioned between EtOAc (10 mL) and $H_2O$ (10 mL). The aqueous phase was separated and extracted with EtOAc (3×10 mL). The combined organic phases were washed with brine, dried over $MgSO_4$, filtered, and concentrated. This crude product was used without further purification. LCMS (ESI) m/z calcd for $C_{28}H_{29}F_2N_9O_5S$: 642.2; found: 642.1 C18 HPLC was monitored at 310 nm: 50% (50:50 product:TLZ; 0-100% B, $R_T$=10.21 min).

In a glass 4 mL vial, a solution of crude linker-TLZ (12 mM in MeOH, 417 μL, 5.0 μmol, 1.0 equiv) was added to a solution of $PEG_{20kDa}$-DBCO (4.3 mM in MeCN, 1.8 mL, 7.7 μmol, 1.5 equiv). The reaction mixture was heated at 37° C. for 1 h. Purification via dialysis (12,000-14,000 MW CO) against 400 mL of MeOH for 16 h and concentration of the retentate afforded the desired compound. C18 HPLC was monitored at 310 nm: 93% (0-100% B, $R_T$=9.28 min).

Figure 9A:
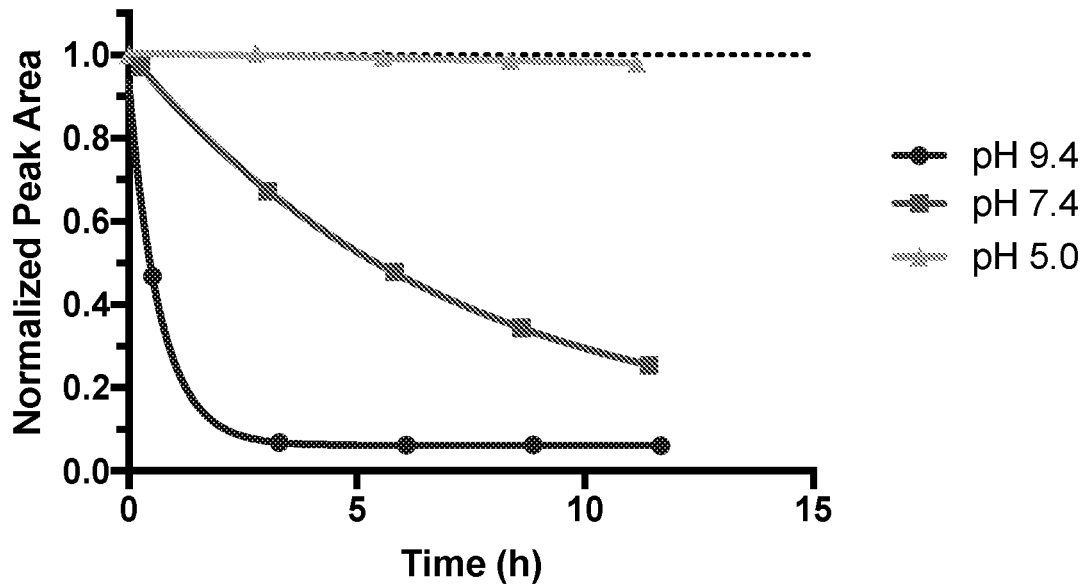
FIG. 9A shows the stability of a non-releasable acylated talazoparib conjugate (Mod=H).
Figure 9B:
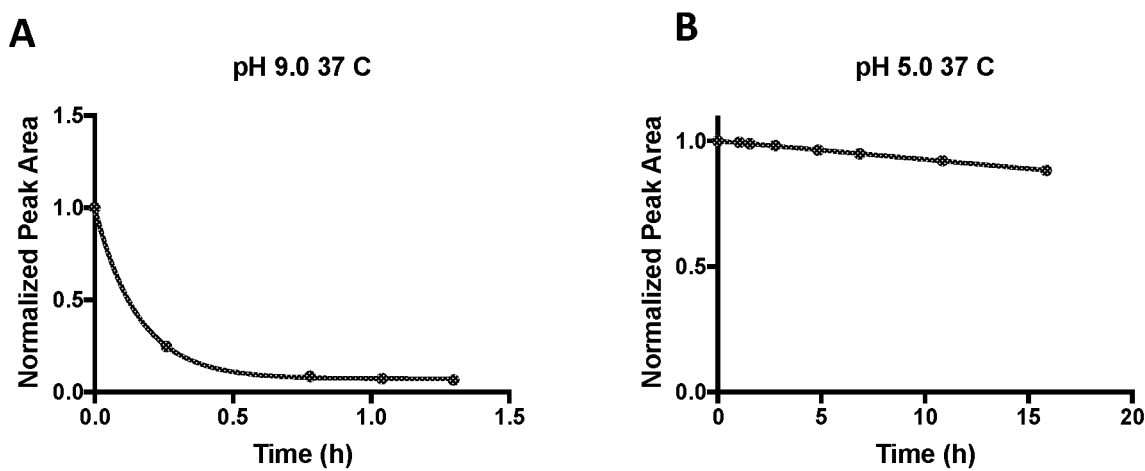
FIG. 9B shows the release kinetics and stability of a releasable acylated talazoparib conjugate ($R^1$=$SO_2$Me).

Stability of conjugate 1-3 (Mod=H) was evaluated at 37° C. at pH 9.4, 7.4, and 5.0 and the results are shown in FIG. 9A. The conjugate was reasonably stable at pH 5.0, with 2% loss over 11 h. However, a pH dependent instability was observed with significant losses of conjugate at pH 9.4 and 7.4, losing 95% and 75% respectively. Stability of conjugate 1-6 was also evaluated at 37° C. at pH 9.0 and 5.0 and the results are shown in FIG. 9B. The releasable conjugate ($R^1$=$SO_2Me$) showed rapid loss of conjugate at pH 9.4 as well as significant elimination at pH 5.

Example 3

Releasable Conjugates of Talazoparib Having $R^7$=Substituted Aryl

Figure 10:
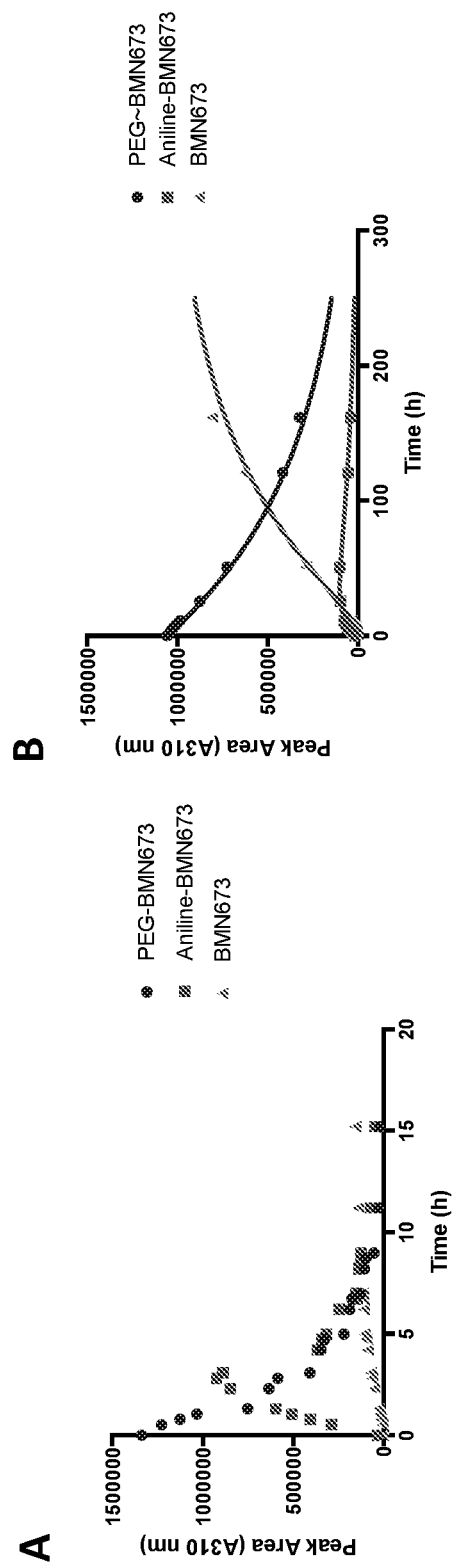
FIG. 10 shows buildup of Mannich base $R^7$—$CH_2$-TLZ ($R^7$=substituted aryl) when releasable conjugates of talazoparib (BMN-673) ($R^7$=substituted aryl) were placed in different buffers: Panel A, pH 9.0; Panel B: pH 7.4.

Talazoparib conjugates were prepared using the linkers of U.S. Pat. No. 8,754,190, i.e., wherein $R^7$=aryl, according to the methods described in Example 1 above. Deprotonation of talazoparib with NaHMDS prior to treatment with the linker-chloromethyl carbamate proceeded in 50-80% conversion. The stable alkylated-talazoparib conjugate showed excellent stability with no observed loss at 37° C. at pH 9.4, 7.4, and 5.0 over ca. 15 h. As shown in FIG. 10, a buildup of an intermediate was observed at both pH 9.0 and 7.4 when the releasable conjugate was placed in buffer. The intermediate was identified by LCMS as the Mannich base $R^7$—$CH_2$-TLZ. At pH 7.4 the PEG-conjugate has a half-life of approximately 88 h, and the Mannich base has an estimated $t_{1/2}$ for release of TLZ of 11.73 h.

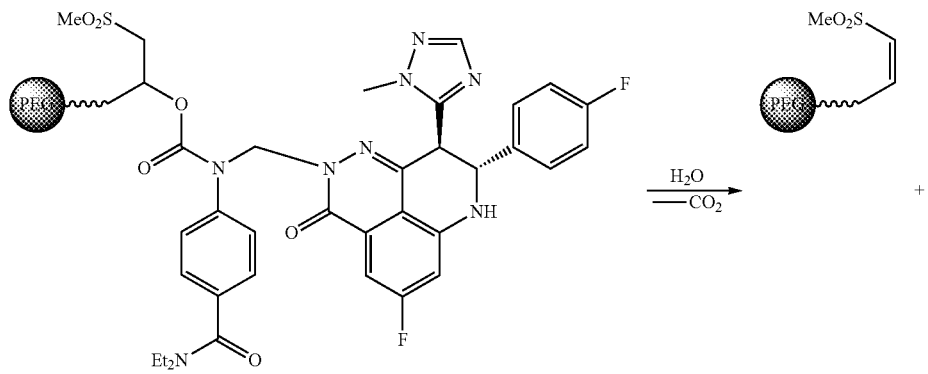

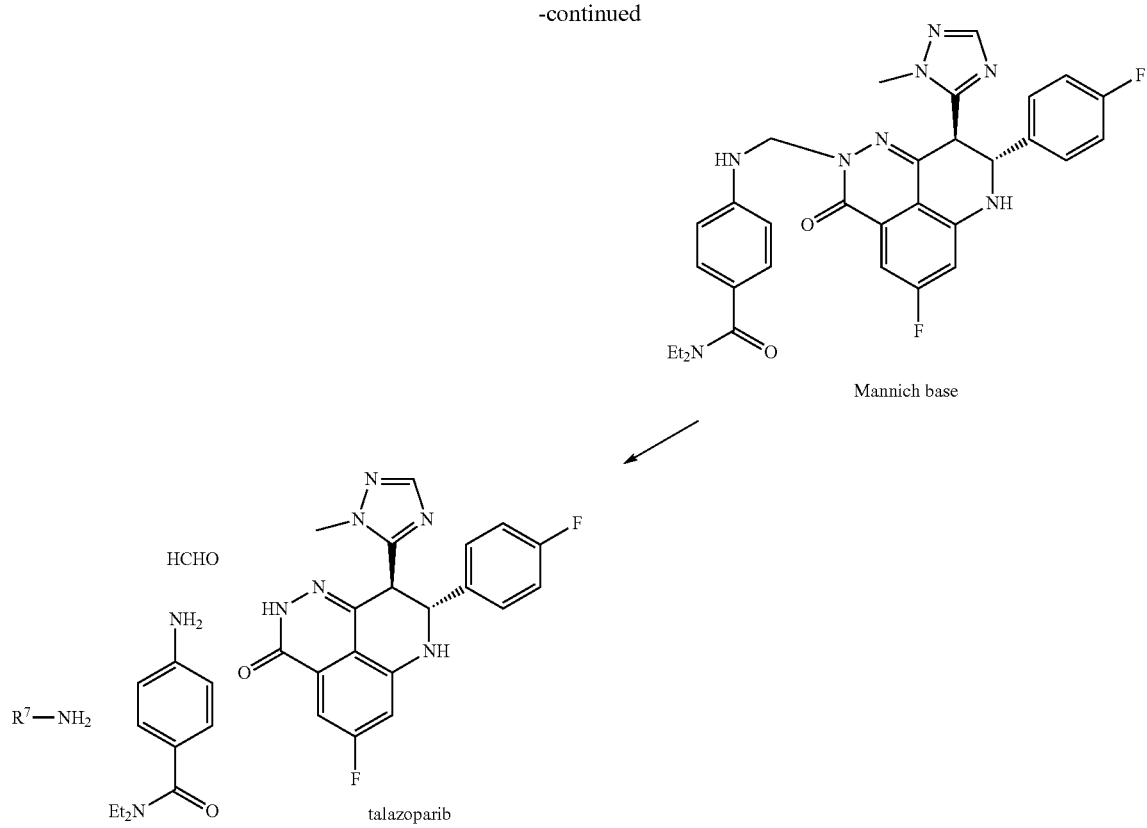
Example 4
Preparation and Stability Study of Linker-Olaparibs
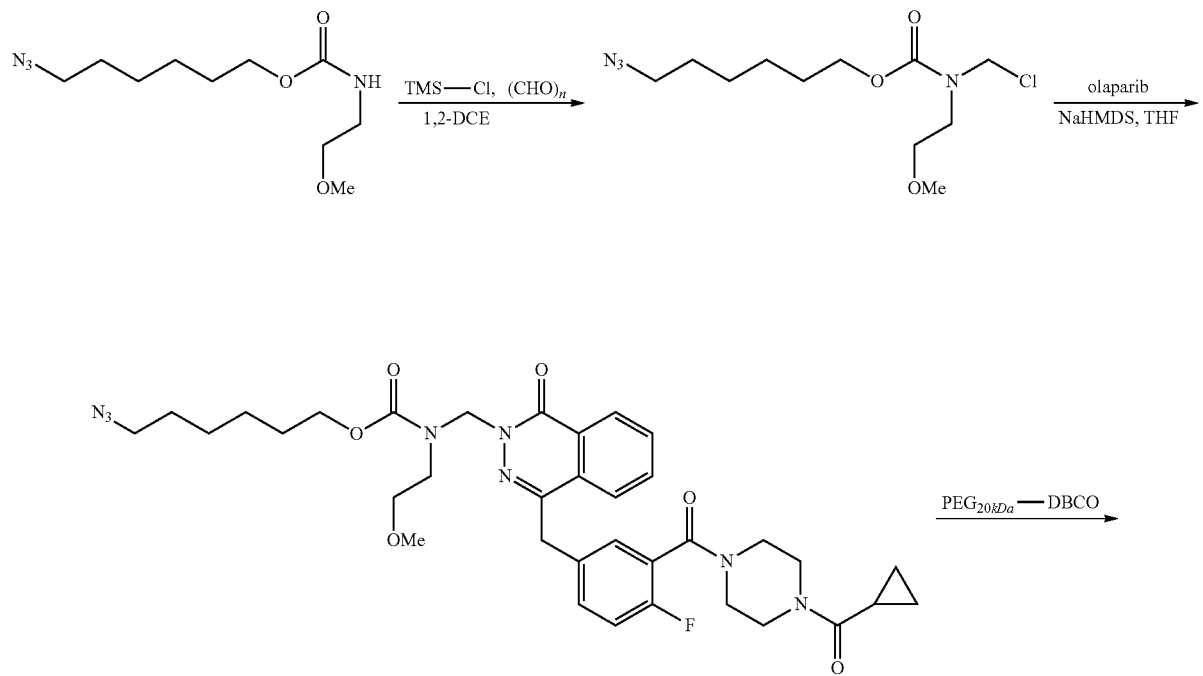

-continued

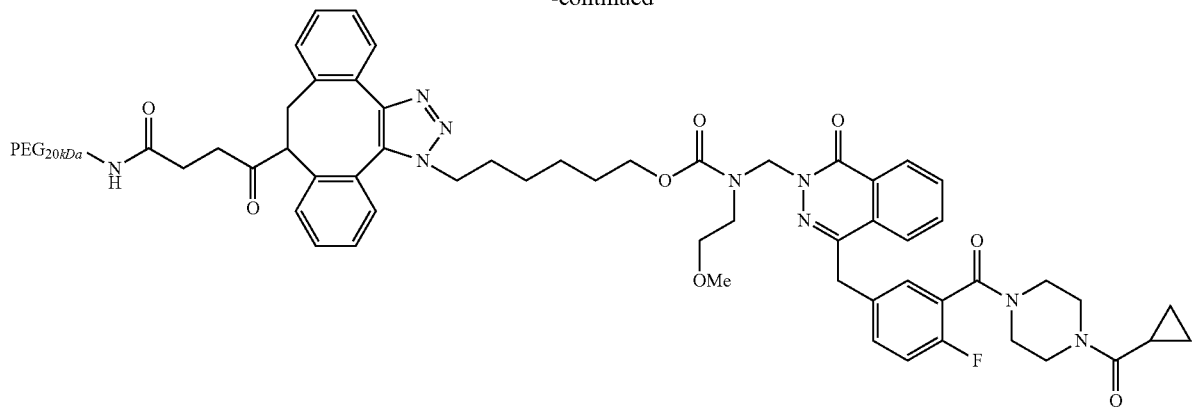

Step 1. 6-Azidohexyl N-(2-methoxyethyl)-N-chloromethyl carbamate. Paraformaldehyde (37 mg, 1.2 mmol) and chlorotrimethysilane (311 µL, 2.46 mmol) were successively added to a solution of 6-azidohexyl N-(2-methoxyethyl) carbamate (150 mg, 0.615 mmol, 0.1 M final concentration) in 6 mL of 1,2-dichloroethane. The stirred reaction was placed in a 50° C. oil bath, and monitored by C18 HPLC. After 24 h, the reaction was judged to be complete. The reaction mixture was concentrated to dryness, and the resulting residue was treated with 10 mL of 1:1 EtOAc:hexane. The suspension was filtered through a 0.2 µm syringe filter, and the filtrate was concentrated to dryness to provide the crude title compound (187 mg) as a colorless liquid that was used without further purification.

Step 2. 6-Azidohexyl N-(2-methoxyethyl)-N-(methylene-olaparib) carbamate. In a heat-gun/vacuum dried round bottom flask, olaparib (10.8 mg, 24.9 µmol, 0.02 M final concentration) was suspended in 1.0 mL of THF under $N_2$. The suspension was cooled in a −78° C. acetone/dry ice bath, and a 1.0 M solution of NaHMDS (30 µL, 30 µmol) in THF was added. After stirring at −78° C. for 5 min, the reaction was air-warmed for 5 min, during which time the reaction became orange in color. After recooling to −78° C., a 0.3 M solution of 6-azidohexyl N-(2-methoxyethyl)-N-chloromethyl carbamate (108 µL, 32.4 µmol) in THF was added. The cold bath was removed, and the orange reaction was air-warmed. Within 20 min, the color changed from orange to bright yellow. After 2 h, the reaction mixture was partitioned between 20 mL of 1:1 EtOAc:$H_2O$. The layers were separated, and the organic phase was washed with $H_2O$ and brine (10 mL each). The organic layer was then separated, dried over $MgSO_4$, filtered, and concentrated by rotary evaporation. The crude concentrate was loaded onto a SiliaSep 4 g column, and product was eluted with a step-wise gradient of acetone in hexane (0%, 20%, 40%; 30 mL each then 60%, 80%; 40 mL each). Clean product-containing fractions were combined and concentrated to dryness to provide the title compound (6 mg, 9 µmol, 37% yield) as a colorless film. C18 HPLC, purity was determined at 280 nm: 92.1% (RV=10.56 mL). LC-MS (m/z): calc, 691.3; obsd, 691.4 [M+H]$^+$.

Step 3. MeO-PEG$_{20kDa}$-DBCO triazole of 6-azidohexyl N-(2-methoxyethyl)-N-(methylene-olaparib) carbamate (non-releasable PEG-olaparib). In a 1.5 mL Eppendorf tube, a 5 mM solution of m-PEG$_{20kDa}$-DBCO (400 µL, 2.0 µmol) was mixed with a 5 mM solution of 6-azidohexyl N-(2-methoxyethyl)-N-(methylene-olaparib) carbamate (0.42 mL, 2.1 µmol, 2.5 mM final concentration) in MeCN. The reaction tube was placed in a 37° C. water bath for 1 h then concentrated to 0.1 mL using a Speed Vac. The residue was diluted to 1.0 mL with $H_2O$ and purified on a PD MidiTrap column. Elution with water provided 1.2 mL of the title compound as an aqueous solution. C18 HPLC, purity was determined at 280 nm: 93.6% (RV=9.36 mL).

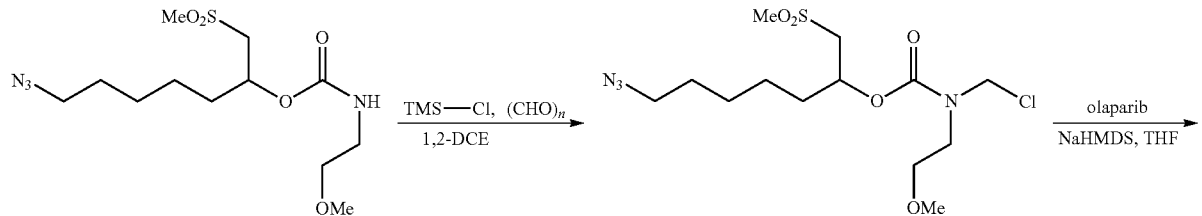

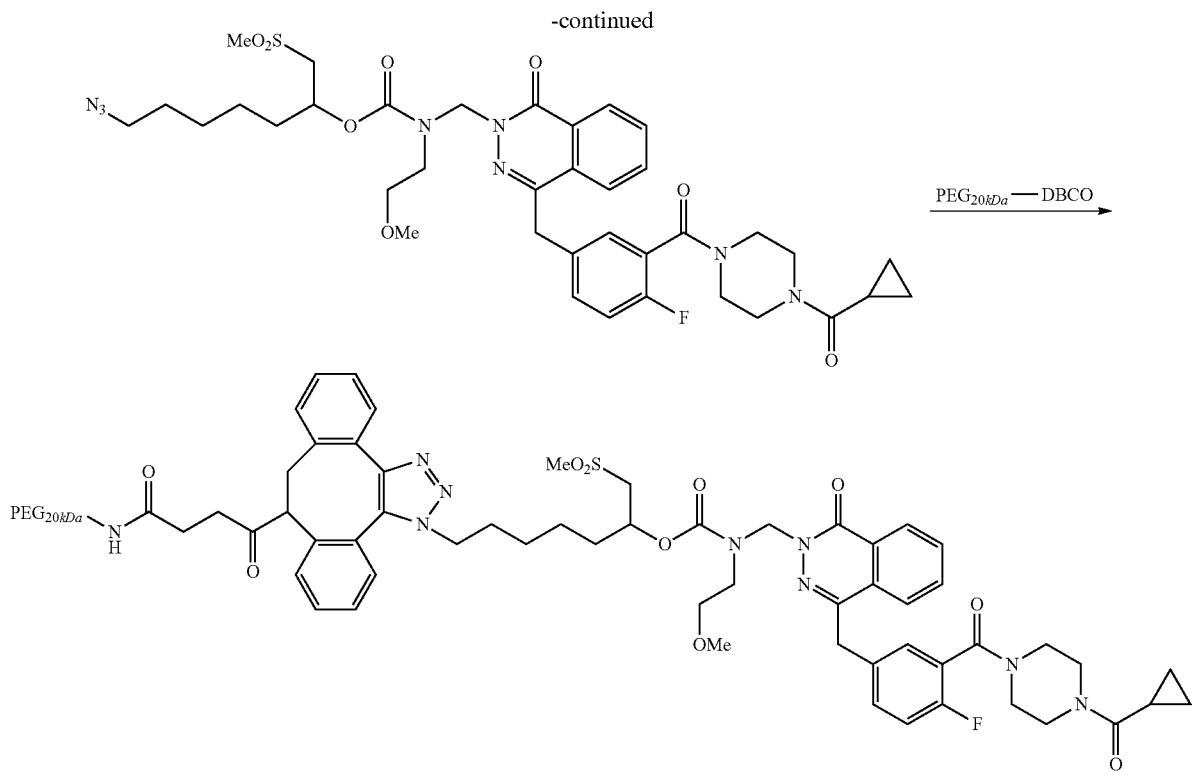

Step 1. 7-Azido-1-(methylsulfonyl)-2-heptyl N-(2-methoxyethyl)-N-chloromethyl carbamate. Paraformaldehyde (24 mg, 0.80 mmol) and chlorotrimethysilane (101 μL, 0.80 mmol) were successively added to a solution of 7-azido-1-(methylsulfonyl)-2-heptyl N-(2-methoxyethyl)-N-chloromethyl carbamate (67 mg, 0.20 mmol, 0.2 M final concentration) in 1 mL of 1,2-dichloroethane. The stirred reaction was placed in a 50° C. oil bath, and monitored by HPLC. After 20 h, the reaction was judged to be complete. The reaction mixture was concentrated to dryness, and the resulting residue was treated with 1.5 mL of 1:1 EtOAc:hexane. The suspension was filtered through a 0.2 μm syringe filter, and the filtrate was concentrated to dryness to provide the crude title compound (80 mg) as a colorless liquid that was used without further purification.

Step 2. 7-Azido-1-(methylsulfonyl)-2-heptyl N-(2-methoxyethyl)-N-(methylene-olaparib) carbamate. In a heat-gun/vacuum dried round bottom flask, olaparib (44 mg, 0.10 mmol, 0.05 M final concentration) was suspended in 1.5 mL of THF under $N_2$. The suspension was cooled in a −78° C. acetone/dry ice bath, and a 1.0 M solution of NaHMDS (100 μL, 100 μmol) in THF was added. The suspension turned purple. After stirring at −78° C. for 5 min, the reaction was air-warmed for 5 min. After recooling to −78° C., a 0.3 M solution of 7-azido-1-(methylsulfonyl)-2-heptyl N-(2-methoxyethyl)-N-chloromethyl carbamate (0.43 mL, 0.13 mmol) in THF was added. The purple color was immediately consumed, and the resulting orange reaction was air-warmed. Within 20 min, the color changed from orange to bright yellow. After 2 h, the reaction mixture was partitioned between 40 mL of 1:1 EtOAc: $H_2O$. The layers were separated, and the organic phase was washed with $H_2O$ and brine (20 mL each). The organic layer was then separated, dried over $MgSO_4$, filtered, and concentrated by rotary evaporation. The crude concentrate was purified by preparative HPLC. Clean product-containing fractions were combined and concentrated to by ~50% to remove MeCN. The resulting aqueous concentrate was extracted with 40 mL EtOAc, and the organic phase was washed with $H_2O$, $NaHCO_3$ (sat aq), and brine (40 mL each). The organic layer was then dried over $MgSO_4$, filtered, and concentrated to dryness by rotary evaporation to provide the title compound (20 mg, 26 μmol, 26% yield) as a colorless oil.

C18 HPLC, purity was determined at 280 nm: 88.0% (RV=9.87 mL).

LC-MS (m/z): calc, 783.3; obsd, 783.4 [M+H]$^+$.

Step 3. MeO-PEG$_{20kDa}$-DBCO triazole of 7-azido-1-(methylsulfonyl)-2-heptyl N-(2-methoxyethyl)-N-(methylene-olaparib) carbamate (releasable PEG-olaparib wherein $R^1$=MeSO$_2$). In a 1.5 mL Eppendorf tube, a 5 mM solution of m-PEG$_{20kDa}$-DBCO (0.40 mL, 2.0 μmol) was mixed with a 10 mM solution of 7-azido-1-(methylsulfonyl)-2-heptyl N-(2-methoxyethyl)-N-(methylene-olaparib) carbamate (0.21 mL, 2.1 μmol, 3 mM final concentration) in MeCN. The reaction tube was placed in a 37° C. water bath for 1 h then concentrated to 0.1 mL using a Speed Vac. The residue was diluted to 1.0 mL with $H_2O$ and purified on a PD MidiTrap column. Elution with water provided 1.2 mL of the title compound ((Formula (III) wherein Z*=triazole, n=4, $R^1$=MeSO$_2$, $R^2$ and each $R^4$=H, Y=N ($R^7$)CH$_2$, $R^7$=2-methoxyethyl, y=1, and D=olaparib) as an aqueous solution. C18 HPLC, purity was determined at 280 nm: 97.2% (RV=9.29 mL).

In vitro stability of olaparib stably-linked PEG conjugate. In a 1.5 mL glass HPLC vial, an aqueous solution of MeO-PEG$_{20kDa}$-DBCO triazole of 6-azidohexyl N-(2-methoxyethyl)-N-(methylene-olaparib) carbamate (0.1 mL) was added to a prewarmed solution of buffer (0.85 mL) and DMSO (45 µL) containing H-Lys(DNP)-OH (10 mM in DMSO, 5 µL; internal standard). The vial was kept in a heated (37° C.) HPLC autosampler, and the stability assay was periodically monitored by C18 HPLC. After one week, no free olaparib was observed.

In vitro kinetics of olaparib cleavage from a soluble PEG conjugate having $R^1$=MeSO$_2$. In each of two 1.5 mL glass HPLC vials, an aqueous solution of PEGylated linker-olaparib (0.1 mL) was added to a pre-warmed mixture of buffer (0.85 mL) and DMSO (45 µL) containing H-Lys(DNP)-OH (10 mM in DMSO, 5 µL, internal standard). The vials were kept in a heated (37° C.) HPLC autosampler, and the β-elimination reactions were periodically monitored by C18 HPLC. The observed half-live of olaparib release in pH 9.58 borate at 37° C. was 1.56 h. Using these data, the calculated half-life at pH 7.4 is 236 h.

Example 5

Preparation of 4-Arm PEG-Olaparib Conjugates

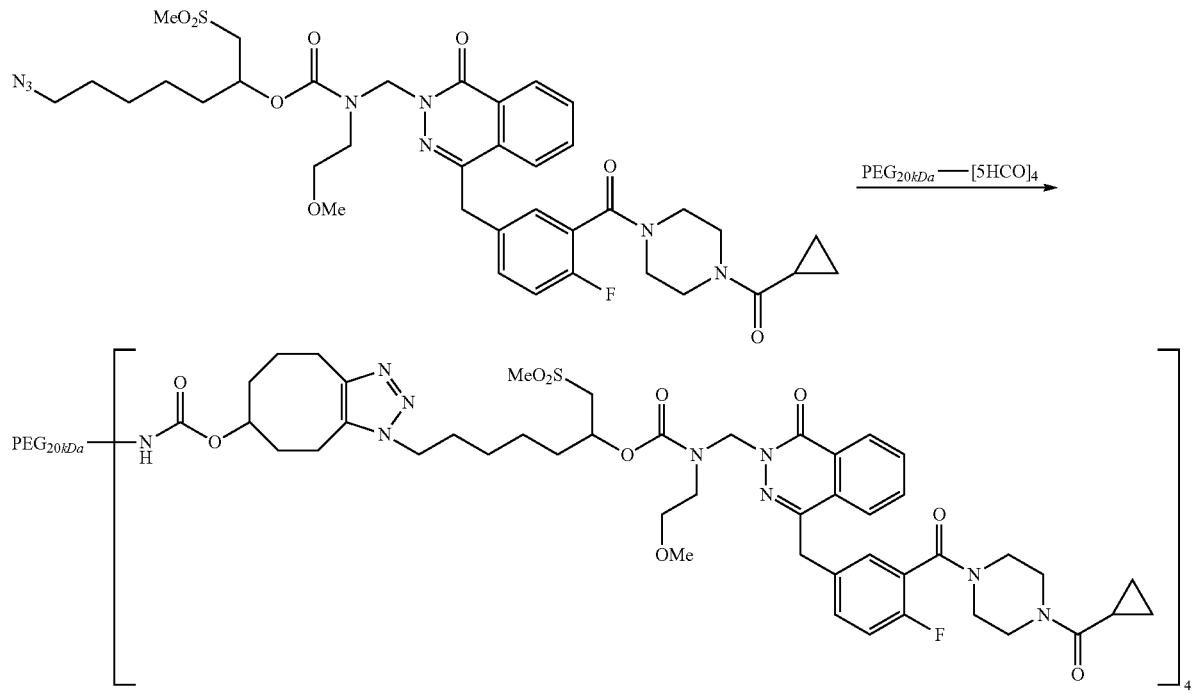

PEG$_{40kDa}$-{7-[(Carbamoyloxy)-4,5,6,7,8,9-hexahydro-1H-cycloocta[d][1,2,3]triazol-1-yl]-1-(methylsulfonyl)-2-heptyl N-(2-methoxyethyl)-N-(methylene-olaparib}$_4$. A 10 mM solution of 7-azido-1-(methylsulfonyl)-2-heptyl N-(2-methoxyethyl)-N-(methylene-olaparib) carbamate (Example 4, 2.3 mL, 23 µmol, 7 mM final concentration) in MeCN was mixed with a solution of PEG$_{40kDa}$-[5HCO]$_4$ (21.2 mM cyclooctyne, 0.94 mL, 20 µmol cyclooctyne; 5 µmol PEG; prepared according to Henise et al., Engineering Reports 7 Apr. 2020; e12213) in MeCN. The reaction vial was sealed with Parafilm, placed in a 37° C. water bath, and periodically monitored by C18 HPLC. After 52 h, the reaction mixture was dialyzed (12-14 k MWCO) against MeOH for 20 h. The retentate was removed and concentrated to ~0.2 mL. The concentrate was diluted with 1 mL of THF then added to 10 mL of ice cold MTBE in a tared 15 mL Falcon tube. The mixture was kept at 0° C. for 20 min then centrifuged (2000×g, 1 min) and decanted. The solid was washed with MTBE (2×10 mL) and isolated as above. The wet solid was dried under high vacuum to provide the title compound (191 mg, 4.31 µmol PEG, 86% yield) as a white solid. C18 HPLC, purity was determined at 280 nm: 97.5% (RV=9.32 mL).

Example 6

Preparation of Releasable PEG-Rucaparib ($R^1$=MeSO$_2$)

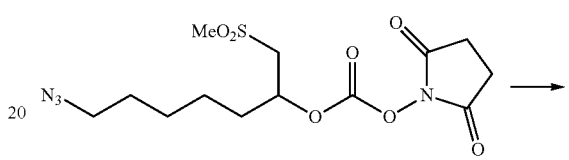

1-18

-continued

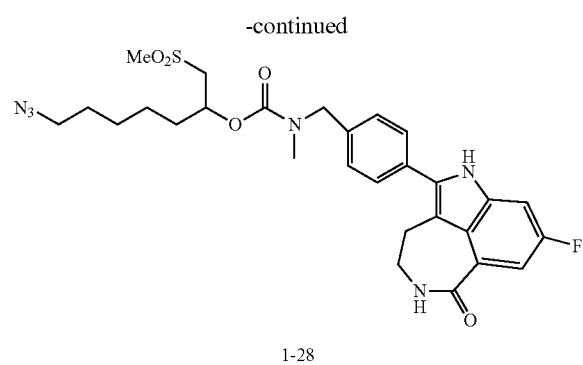

1-28

Synthesis of azido-linker-rucaparib. A 1.5-mL glass vial equipped with cap and stir bar was charged sequentially with 7-azido-1-(methylsulfonyl)-2-heptyl succinimidyl carbonate (18 mg, 47 μmol, 1.0 equiv, 47 mM final concentration), MeCN (1 mL), rucaparib phosphate (20 mg, 47 μmol, 1.0 equiv, 47 mM final concentration), iPr$_2$NEt (16 μL, 94 μmol, 2.0 equiv, 94 mM final concentration), and DMSO (0.5 mL). The reaction was stirred at ambient temperature for 30 min. Reaction progress was monitored by C18 HPLC (0-100% B, 355 nm) and showed rucaparib ($R_T$=7.25 min) converting to a less polar product ($R_T$=10.79 min). The reaction mixture was partitioned between EtOAc (5 mL) and 10% citric acid (5 mL). The aqueous phase was separated and extracted with EtOAc (3×5 mL). The combined organic phases were washed with brine, dried over MgSO$_4$, filtered, and concentrated. Purification via column chromatography (4 g silica gel cartridge: 50%, 75%, 100% EtOAc/hexanes., 10% acetone/EtOAc) afforded 17 mg (29 μmol, 62%) of the desired product. LCMS (ESI) m/z [M+H]$^+$ calcd for $C_{28}H_{33}FN_6O_5S$: 585.2; found: 585.2 C18 HPLC was monitored at 355 nm: 98% (0-100% B, $R_T$=9.93 min)

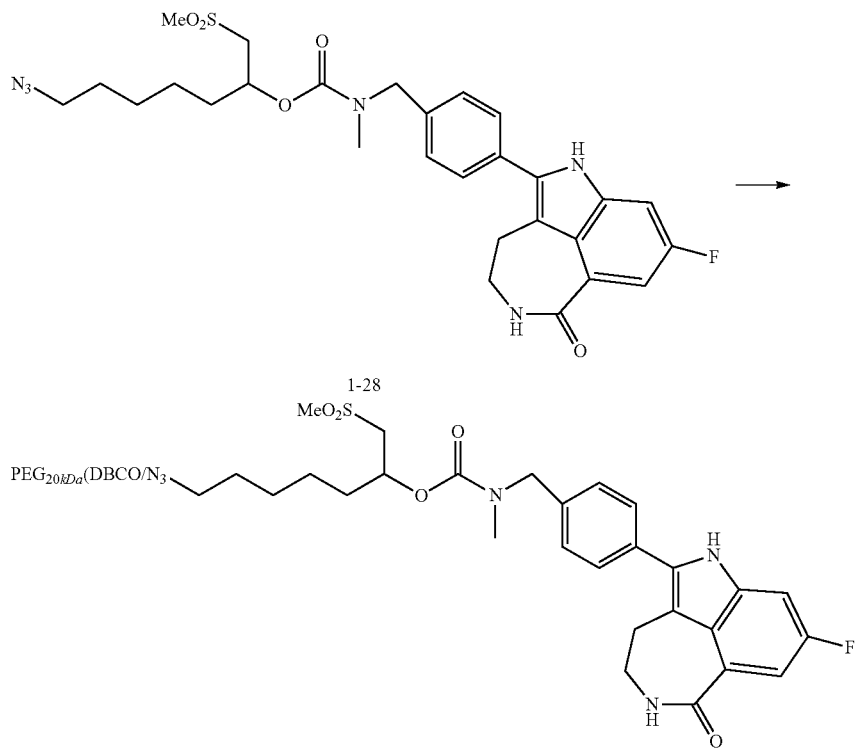

Synthesis of releasable PEG-rucaparib conjugate. A 1.5-mL centrifuge tube was charged with a solution of PEG$_{20kpa}$-DBCO (4.9 mM, 1.0 mL, 4.9 μmol, 1.0 equiv, 4.9 mM final concentration) and a solution of azido-linker-rucaparib (31 mM linker-rucaparib, 174 μL, 5.4 μmol, 1.1 equiv, 5.5 mM final concentration). The reaction mixture was heated at 37° C. for 16 h. Reaction progress was monitored by C18 HPLC (0-100% B, 355 nm) and showed linker-rucaparib ($R_T$=9.94 min) converting to a more polar product ($R_T$=9.23 min). The reaction mixture was then dialyzed (12-14,00 MWCO) against 400 mL for 18 h. The retentate was concentrated to afford 97 mg of PEG conjugate as a colorless residue. C18 HPLC was monitored at 355 nm: 96% (0-100% B, $R_T$=9.23 min).

Example 7

Preparation of Releasable PEG-VX970
($R^1$=MeSO$_2$)

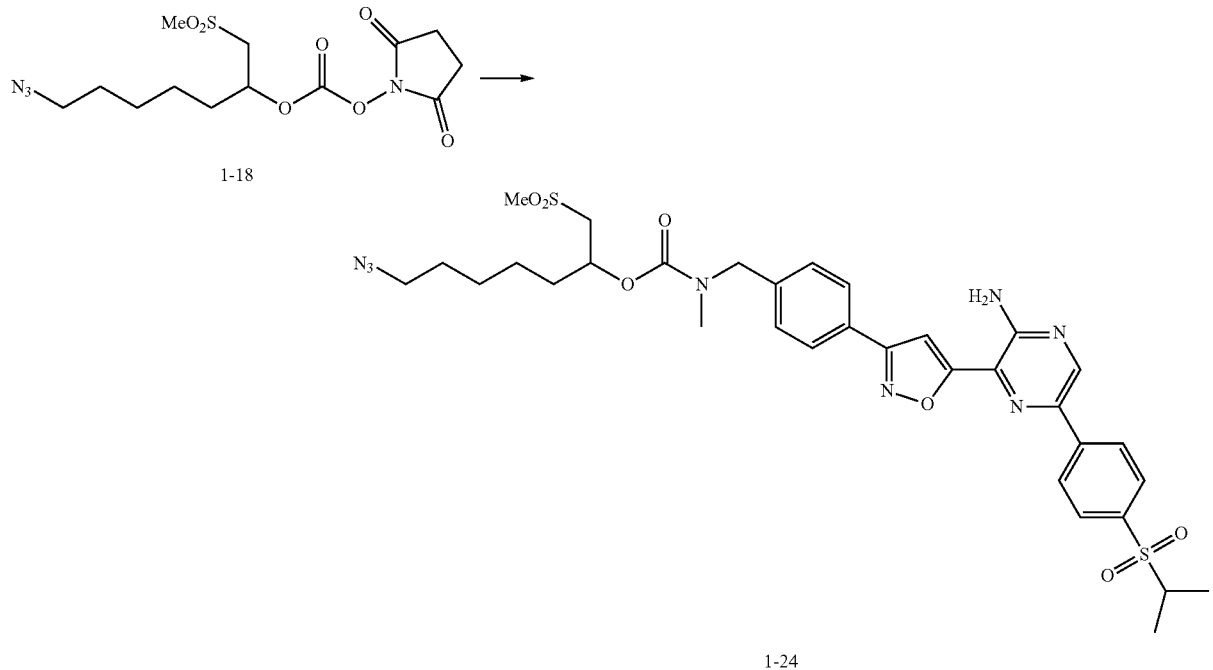

Azido-Linker-VX970 ($R^1$=MeSO$_2$). A 1.5-mL glass vial equipped with cap and stir bar was charged sequentially with 7-azido-1-(methylsulfonyl)-2-heptyl succinimidyl carbonate (15 mg, 39 μmol, 0.9 equiv), MeCN (0.5 mL), VX970 (20 mg, 43 μmol, 1.0 equiv), iPr$_2$NEt (10 μL, 60 μmol, 1.5 equiv), and DMSO (0.5 mL). The reaction was stirred at ambient temperature for 30 min. Reaction progress was monitored by C18 HPLC (0-100% B, 310 nm) and showed VX970 ($R_T$=8.56 min) converting to a less polar product ($R_T$=10.85 min). The reaction mixture was used without workup or further purification. LCMS (ESI) m/z [M+H]+ calcd for $C_{33}H_{40}N_8O_7S_2$: 725.3; found 725.3. C18 HPLC was monitored at 310 nm: 90% (0-100% B, $R_T$=10.85)

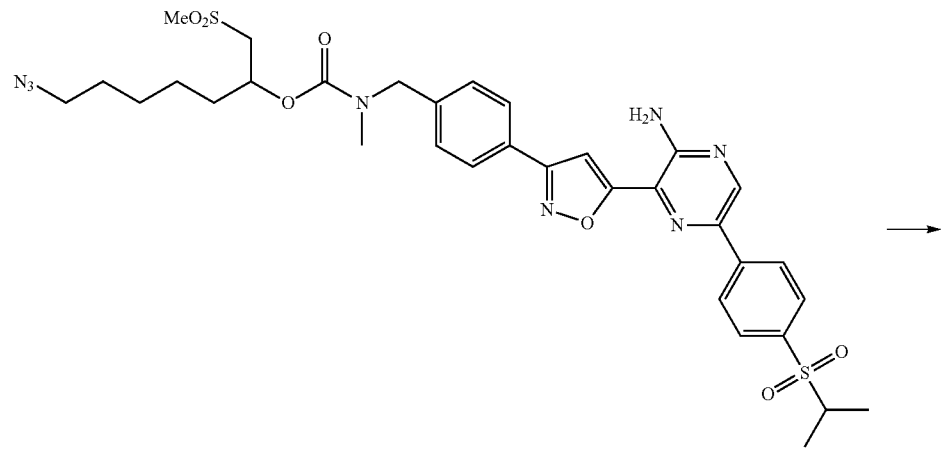

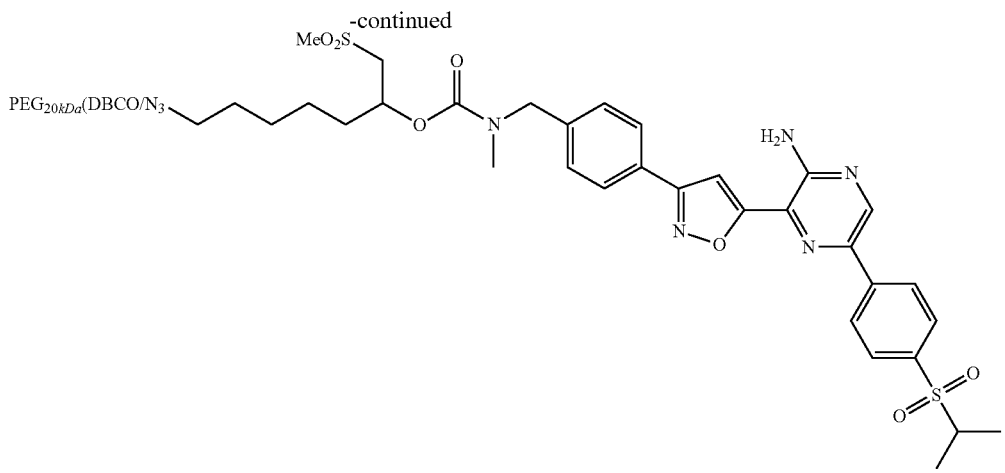

1-25

Releasable PEG-VX-970 ($R^1$=MeSO$_2$). A 1.5 mL centrifuge tube was charged with a solution of PEG$_{20kDa}$-DBCO (4.4 mM in MeCN, 1.0 mL, 4.4 µmol, 1.0 equiv) and a solution of azido-linker-VX970 (171 µL, 4.8 µmol, 1.1 equiv). The reaction mixture was heated at 37° C. for 30 min, then additional PEG-DBCO (100 µL, 0.4 µmol, 0.1 equiv) was added. The reaction mixture was heated at 37° C. for 1 h. Reaction progress was monitored by C18 HPLC (0-100% B, 310 nm) and showed linker-VX970 ($R_T$=10.85 min) converting to a more polar product ($R_T$=9.42 min). The reaction mixture was allowed to cool to ambient temperature, and was dialyzed against 500 mL MeOH for 18 h (12,000-14,000 MWCO). The retentate was concentrated and the resulting white residue was dissolved in 10 mM NaOAc (pH 5) to give a colorless solution (ca 4 mM). C18 HPLC was monitored at 310 nm: >98% (0-100% B, $R_T$=9.42 min)

Example 8

Pharmacokinetic Study of PEG-Talazoparib

Conjugate of Formula (III) Wherein Z*=Triazole, n=4, $R^1$=MeSO$_2$, $R^2$ and each $R^4$=H, Y=N($R^7$)CH$_2$, $R^7$=2-Methoxyethyl, y=4, and D=Talazoparib Male CD-1 mice (N=20, average weight 30 g) were dosed IP with solution of releasable PEG-talazoparib ($R^1$=SO$_2$Me) or non-releasable PEG-talazoparib prepared according to Example 1 (30 µmol/kg, 2.03 mM, 14.8 mL/kg) in isotonic acetate (pH 5). At various time points blood samples (N=4 mice, 200 µL) were taken, immediately treated with a 1M Citrate/0.1% Pluronic F68 (pH 4.5) solution (10% of obtained sample volume), and centrifuged to give plasma samples (100 µL) which were kept on ice during processing and frozen at −80° C. until analysis. The blood draw schedule is as follows: mice 1-4 were sampled at 1 h and 24 h; mice 5-8 were sampled at 2 h and 48 h; mice 9-12 were sampled at 4 h and 72 h; mice 13-16 were sampled at 8 h and 96 h; and mice 17-20 were sampled at 12 h and 120 h.

Figure 11:
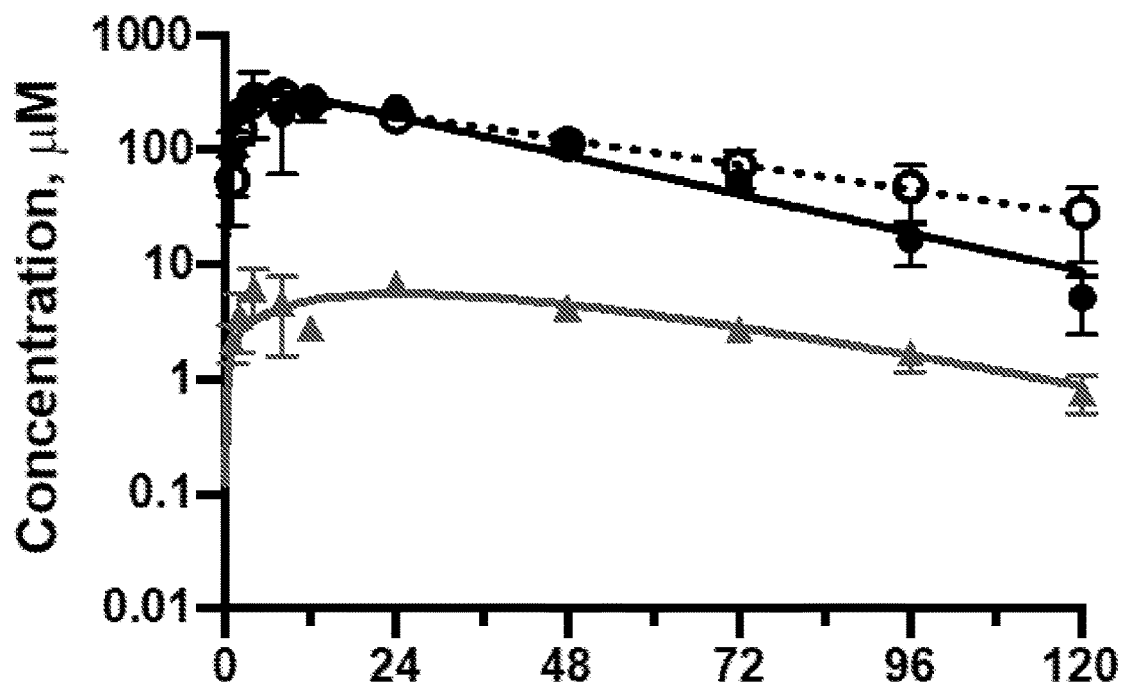
FIG. 11 shows the results of a pharmacokinetic study in mice of a non-releasable PEG-talazoparib conjugate (dotted line, open circles) and a releaseable PEG-talazoparib conjugate of Example 11 (solid circles), and the free talazoparib released from the releasable conjugate (triangles).

An aliquot of each PK sample or standard (10 µL) was treated with MeOH/0.5% AcOH (50 µL) containing 15 µM DNP-Lys as an internal standard. The samples were vigorously vortexed, centrifuged (21,000×g, 4° C., 10 min), and transferred to HPLC vials containing H$_2$O/0.5% AcOH (200 µL). Samples were injected (220 µL) onto a C18 HPLC column and eluted with H$_2$O/MeCN/0.1% TFA (0-100% B over 15 min). A standard curve was generated by serial dilution of a solution of PEG-talazoparib (1 mM talazoparib on PEG; 0.25 mM conjugate) in mouse serum on ice. Aliquots were processed and analyzed as above. Peak areas were plotted against concentration and fitted to a linear equation. The LLOQ for PEG-talazoparib was determined to be 16 pmol (2 µM in 10 µL serum). PK sample concentrations were calculated based on interpolation peak areas against the standard curve and plotted against time and the results are shown in FIG. 11. Absorption and elimination half-lives were calculated by fitting to a bi-exponential equation to the resulting data with weighting points by 1/$Y^2$.

PK parameters are provided in Table 1 below.

TABLE 1

| PK Parameters of releasable PEG-talazoparib (Mod = SO$_2$Me)[a] | |
|---|---|
| Dose | 30 µmol/kg |
| $C_0$[b] | 544 µM |
| $C_{max}$[c] | 331 µM |
| $T_{max}$ | 9 h |
| $t_{1/2,\alpha}$ | 3 h |
| $t_{1/2,\beta}$ | 19 h |

[a]PK parameters derived from fits of pharmacokinetic data to a biexponential (y = C$_0$ * ((exp(-k$_1$ * t) − exp(-k$_2$ * t)).
[b]C$_0$ is the theoretical concentration at t = 0 obtained by extrapolation of the t$_{1/2,\beta}$ and calculated in the above equation.
[c]C$_{max}$ and T$_{max}$ are the maximum concentration and time of maximum concentration.

Example 9

Efficacy of PEG-Talazoparib Conjugates in Murine MX-1 Xenografts

The MX-1 human triple-negative breast carcinoma cell line was obtained from Charles River Labs (Frederick, Md). Cells were cultured in RPMI-1640, 10% FBS and 1% 2 mM L-glutamine at 37° C. in 95% air/5% CO$_2$ atmosphere.

Tumor xenografts were established by subcutaneous injection with MX-1 tumor cells (2×10$^6$ cells in 100 µl of serum free medium mixed 1:1 with Matrigel) into the right flank of female NCr nude mice. When tumor xenografts reached 1000-1500 mm$^3$ in donor mice, they were resected, divided into even-size fragments (approximately 2.5×2.5 mm), embedded in Matrigel and re-implanted via subcutaneous trocar implantation in receiver mice.

Solutions of talazoparib (50 μM) were prepared as by adding a solution of talazoparib in DMSO (55 mM, 454 μL) to the oral dosing buffer consisting of 10% dimethylacetamide, 6% solutol, and 84% PBS. Talazaparib content was determined by $\varepsilon_{310nm}$=9872 $M^{-1}cm^{-1}$ in 10% dimethylacetamide, 6% solutol, and 84% PBS Solutions were delivered p.o. at 8.5-19 mL/kg to deliver 0.4 to 0.9 μmol/kg talazoparib. Solutions of PEG-talazoparib (Example 1, $R^1$=MeSO$_2$, $R^7$=MeO(CH$_2$)$_2$) containing up to 8 mM talazoparib (2 mM PEG~[talazoparib]$_4$) were prepared in isotonic acetate (pH 5), sterile filtered through a 0.2 μM syringe filter, and TLZ content was determined by $\varepsilon_{310nm}$=9872 $M^{-1}cm^{-1}$ in 10% dimethylacetamide, 6% solutol, and 84% PBS. Doses were delivered IP at ~15 mL/kg mL/kg to deliver 15-120 μmol drug/kg.

Mice bearing MX-1 tumors were dosed when tumors reached ~100-300 mm³ in size. Dosing solutions were administered as indicated above. Tumor volumes (caliper measurement: 0.5×(length×width)) and body weights were measured twice weekly. Data is plotted as relative tumor volume versus time and are displayed as average +/−SEM. Mice bearing large tumors were dosed when tumors reached 1000-3000 mm³. The results are shown in FIGS. 5-7 and Table 3 below.

The nomenclature used for describing disease in individual mice was as proposed by Houghton et al. (Pediatric Blood & Cancer, 2007 49:928-40), and is summarized in Table 2. Progressive disease (PD) was classified as PD1 or PD2 based on the tumor growth delay (TGD) values calculated as the number of days to event. For each mouse, TGD was calculated by dividing the time to event by the median time to event in the control group. For each individual mouse that had PD and had an event in the treatment groups, a TGD value was calculated by dividing the time to event for that mouse by the median time to event in the control group. Median times to event were estimated based on the Kaplan-Meier event-free survival distribution.

TABLE 3

Houghton analysis for PEG~TLZ against MX-1 tumors

| single dose μmol/kg | Dose μmol/kg | PD1 | PD2 | SD | PR | CR | MCR |
|---|---|---|---|---|---|---|---|
| TLZ | 0.4 | | 4 | | | | 1 |
| TLZ | 0.7 | | | | 2 | 2 | 1 |
| PEG~TLZ | 120 | | | 3* | 1* | | 1 |
| PEG~TLZ | 40 | | | 2* | | | |
| PEG~TLZ | 13 | 1 | 1 | | | 1 | 2 |

*= Found dead D14

Example 10

Efficacy of PEG-Talazoparib Conjugate in Murine Xenografts

Figure 12:
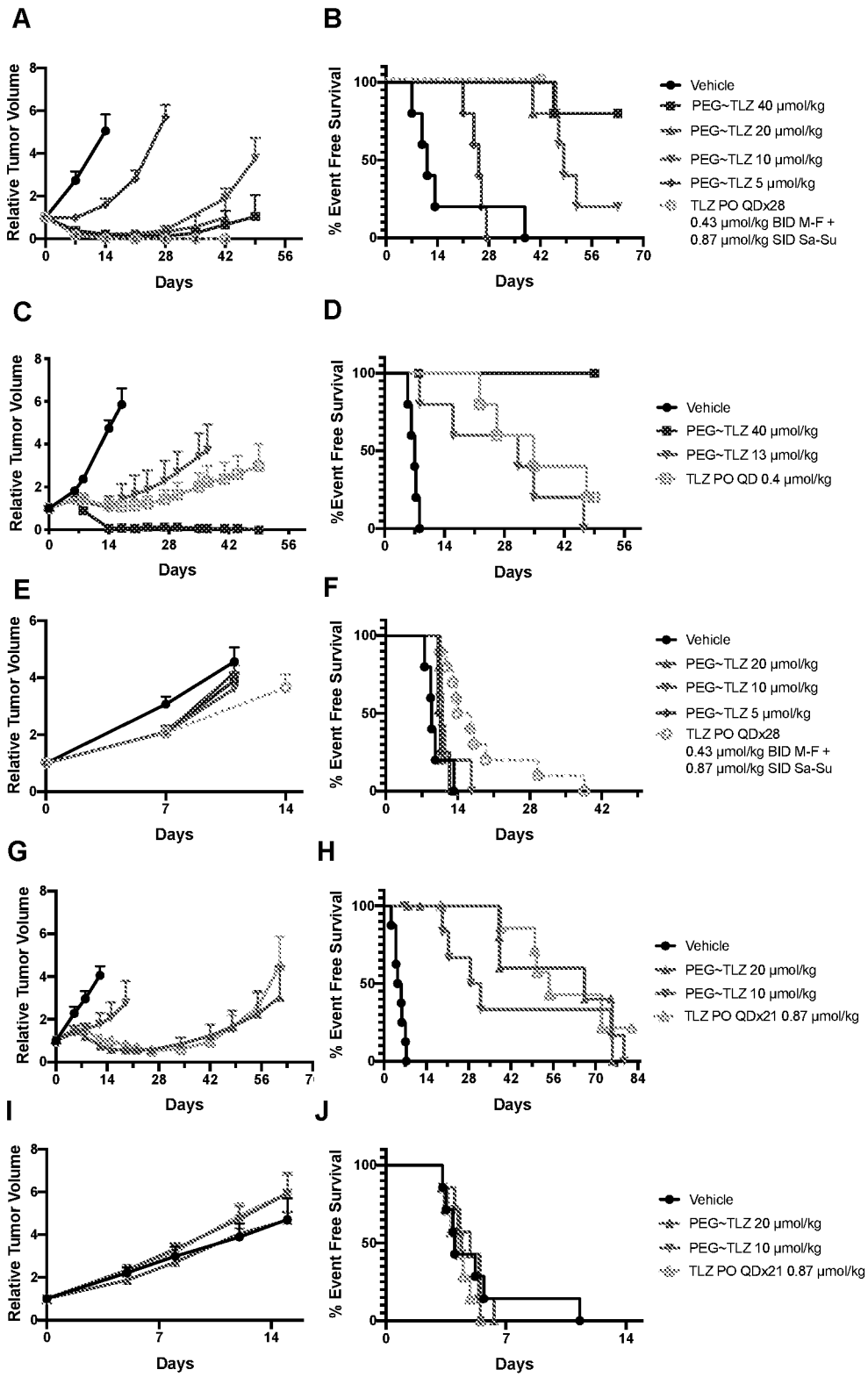
FIG. 12 shows the efficacy of a releasable PEG-talazoparib conjugate given as a single dose on Day 0 against KT-10 (Panels A,B), MX-1 (Panels C,D), TC-71 (Panels E,F), DLD-1 BRCA2$^{-/-}$ (Panels G,H), and DLD-1 BRCA2$^{wt/wt}$ (Panels I,J) mouse xenografts, as compared to 28 daily oral doses of free talazoparib.

Efficacy of a releasable PEG-talazoparib conjugate prepared according to Example 1 was also studied in murine MX-1, KT-10, TC-71, DLD-1 BRCA2$^{-/-}$, and DLD-1 BRCA2$^{wt/wt}$ xenografts similarly to Example 9. The results are shown in FIG. 12.

Cohorts of mice (n=5) bearing subcutaneous KT-10 tumors were treated with a single IP injection of PEG-talazoparib conjugate at 5- to 40-μmol/kg of. Tumor volumes were measured weekly, and event-free survival (EFS) was calculated for each group, where the event was defined as quadrupling of the initial tumor volume on the first day of treatment. Dosing the PEG-talazoparib conjugate at 40 μmol/kg caused an average ~17% weight loss at day 7, but all animals recovered by day 14. The dose-dependent tumor growth responses and Kaplan-Meier event-free survival distributions of the PEG-talazoparib conjugate are shown in FIGS. 12A and 12B; control tumors had a median EFS of 11 days. With the PEG-talazoparib conjugate at 5 μmol/kg TLZ, 3 tumors showed slight regressions and the median EFS was 25 days with all tumors reaching the event. At 10 μmol/kg, all tumors regressed >50% and showed a median EFS of 48 days with 4/5 tumors reaching an event. At higher doses of the PEG-talazoparib conjugate at 20- and 40 μmol/kg, all tumors showed EFS>8 wks; there was complete regression with regrowth of 4 of 5 tumors in the group

TABLE 2

Nomenclature describing disease in individual mice

| Name | Abb. | Description |
|---|---|---|
| Progressive disease 1 | PD1 | <50% regression from initial volume during the study period and >25% increase at the end; mouse had a TGD value ≤1.5 |
| Progressive disease 2 | PD2 | PD1, and mouse had a TGD value >1.5 |
| Stable disease | SD | <50% regression from initial volume during the study period and ≤25% increase at the end |
| Partial response | PR | tumor volume regression ≥50% for at least one time point but with measurable tumor (>0.05 cm³) |
| Complete response | CR | disappearance of measurable tumor mass (<0.05 cm³) for at least one time point |
| Maintained complete response | MCR | CR, and tumor volume was <0.05 cm³ at the end of the study |
| Event | | quadrupling of tumor volume from the initial tumor volume or death |
| Event-free survival | EFS | time to the first event, or to the end of the study for tumors that did not quadruple in volume |
| Tumor growth delay | TGD | time to event divided by the median time to event in the control group. | treated with 20 μmol/kg and 2 of 5 tumors in mice treated with 40 μmol/kg. The EFS T/C for a dose of the PEG-talazoparib conjugate at 10 μmol/kg was 4.3 which qualifies it as a highly active agent against this tumor.

Mice bearing TLZ-sensitive BRCA1-deficient MX-1 tumors were treated with daily oral TLZ and single IP injections of PEG-talazoparib conjugate. The dose-dependent tumor growth responses and Kaplan-Meier event-free survival distributions of the PEG-talazoparib conjugate are shown in FIGS. 12C and 12D. With daily dosing of 0.4 μmol/kg (0.15 mg/kg) TLZ, quadrupling of initial size was not reached in all tumors, so an event was defined as doubling of the initial tumor volume (FIG. 12D); control tumors had a median 2×-EFS of 7 days and with 0.4 μmol/kg TLZ there was growth suppression for ~3 wks, after which tumors grew and reached median EFS at 35 days. Clearly, the MX-1 tumor is not as sensitive to TLZ as KT-10 which shows maintained CRs over 12 wks with only 0.1 mg/kg TLZ daily dosing (26). With PEG-talazoparib conjugate at 40 μmol/kg TLZ, animals lost ~9% weight by day 8 and 2 of 5 died. The remaining 3 mice regained their initial weight and did not show tumor outgrowth after as long as 50 days; the censored deceased mice did not allow reliable EFS analysis. Mice tolerated single doses of PEG-talazoparib conjugate at 5- to 30 μmol/kg without weight loss. A dose of PEG-talazoparib conjugate at 13 μmol/kg resulted in a median EFS of 31 days which was similar to the 35 day EFS for free TLZ at 0.4 μmol (0.15 mg)/kg/day. The EFS T/C of 4.4 for PEG-talazoparib conjugate at 13 μmol/kg indicates the drug is highly active at this low dose.

Mice bearing TC-71 tumors were treated with daily oral TLZ and single IP injections of PEG-talazoparib conjugate. Tumor growth was not inhibited by PEG-talazoparib conjugate concentrations as high as 40 μmol/kg, and the EFS curves indicate insignificant activity (FIGS. 12E and 12F).

Mice bearing BRCA2$^{-/-}$ and DLD-1 BRCA2$^{wt/wt}$ tumors were treated with daily oral TLZ and single IP injections of PEG-talazoparib conjugate. For BRCA2$^{-/-}$, one injection of PEG-talazoparib conjugate at 20 μmol/kg was equi-effective in suppressing tumor growth as 21 daily doses of 0.87 μmol (0.33 mg)/kg/day (FIG. 12G). Median event free survival was increased ~5-fold for animals treated with PEG-talazoparib conjugate at 10 μmol/kg and 11 or 13-fold for animals treated with daily TLZ×21 days or a single dose of 20 μmol/kg PEG-talazoparib conjugate, respectively (FIG. 12H). In contrast, the BRCA2 replete DLD-1 tumor is resistant to either QD oral TLZ or IP PEG-TLZ (FIGS. 12I and 12J); here, there was no increase in median EFS of treated animals vs controls.

Example 11

Preparation of 4-Arm Releasable Conjugates

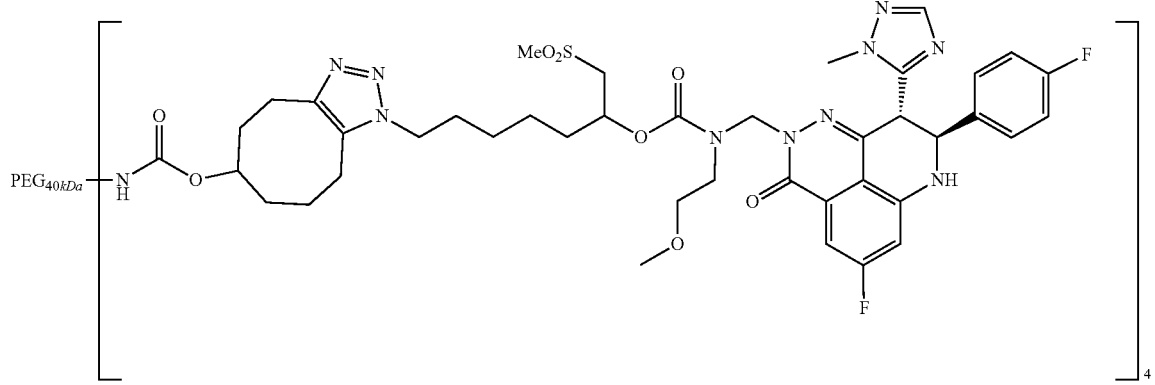

A 20-mL scintillation vial was charged with linker-talazoparib (Example 1) wherein Z=azide, n=5, $R^1$=MeSO$_2$, $R^2$ and each $R^4$=H, Y=N($R^7$)CH$_2$, $R^7$=2-methoxyethyl, and D=talazoparib (392 mg, 0.538 mmol, 1.3 equiv, 34 mM final concentration) and a solution of PEG$_{40kDa}$-[5HCO]$_4$ (15.6 mL, 0.414 mmol, 1 equiv, 27 mM final concentration). The reaction mixture was heated at 37° C. for 48 h. Analysis via C18 HPLC (0-100% B, 310 nm) showed linker-TLZ converting to a more polar product. The reaction mixture was then dialyzed against 50% MeOH/H$_2$O (1 L) for 18 h, 100% MeOH for 4 h, and 100% MeOH for 4 h. The dialysis retentate was concentrated, dissolved in THF (30 mL), and added to stirring MTBE (250 mL). The resulting suspension was stirred at ambient temperature for 15 min and the solids were collected via vacuum filtration through a sintered glass funnel. The collected solids were washed with MTBE (3×100 mL) and dried under vacuum to afford 2.93 g (0.264 mmol TLZ, 64% yield) of the desired product (formula (III) wherein Z* is triazole, n=5, $R^1$ is MeSO$_2$, $R^2$ is H, each $R^4$ is H, Y is N($R^7$)CH$_2$, $R^7$ is 2-methoxyethyl, and D is talazoparib) as a white solid. C18 HPLC purity was determined at 310 nm: 92% (0-100% B, $R_T$=10.39).

A solution containing 100 mg/mL of conjugate was assayed for PEG and TLZ content. PEG content was measured using a modified BaCl$_2$/I$_2$ assay (4,5), and PEG-TLZ content was measured by A310 in isotonic acetate using 9872 M$^{-1}$cm$^{-1}$ to give a ratio of 3.6 (95% of theoretical based on PEG REG).

Solutions containing the conjugate (~100 μM) were heated at 37° C. in kinetics buffer (100 mM borate, pH 9.4 or 9.0, 37° C.; 100 mM bicine, pH 8.4, 37° C.; 100 mM HEPES, pH 7.4, 37° C.; 100 mM NaOAc, pH 5.0, 37° C.) containing H-Lys(DNP)-OH (10 mM DMSO, 10 μL, 100 μM final concentration). Periodically reaction progress was monitored by C18 HPLC (310 nm) by direct injection of reaction aliquots (10 μL) and elution with H$_2$O/MeCN/0.1% TFA. Peak areas were plotted against time. A half-life for talazoparib release corresponding to 160 h at pH 7.4 was determined.

Example 12

Preparation of Conjugates Wherein Z*=Carboxamide

Preparation of conjugates wherein Z*=carboxamide is illustrated by the preparation of a PEG-talazoparib conjugate wherein $R^1$=MeSO$_2$, and related conjugates may be prepared by substituting the appropriate linker-drug of Formula (II) from the above Examples.

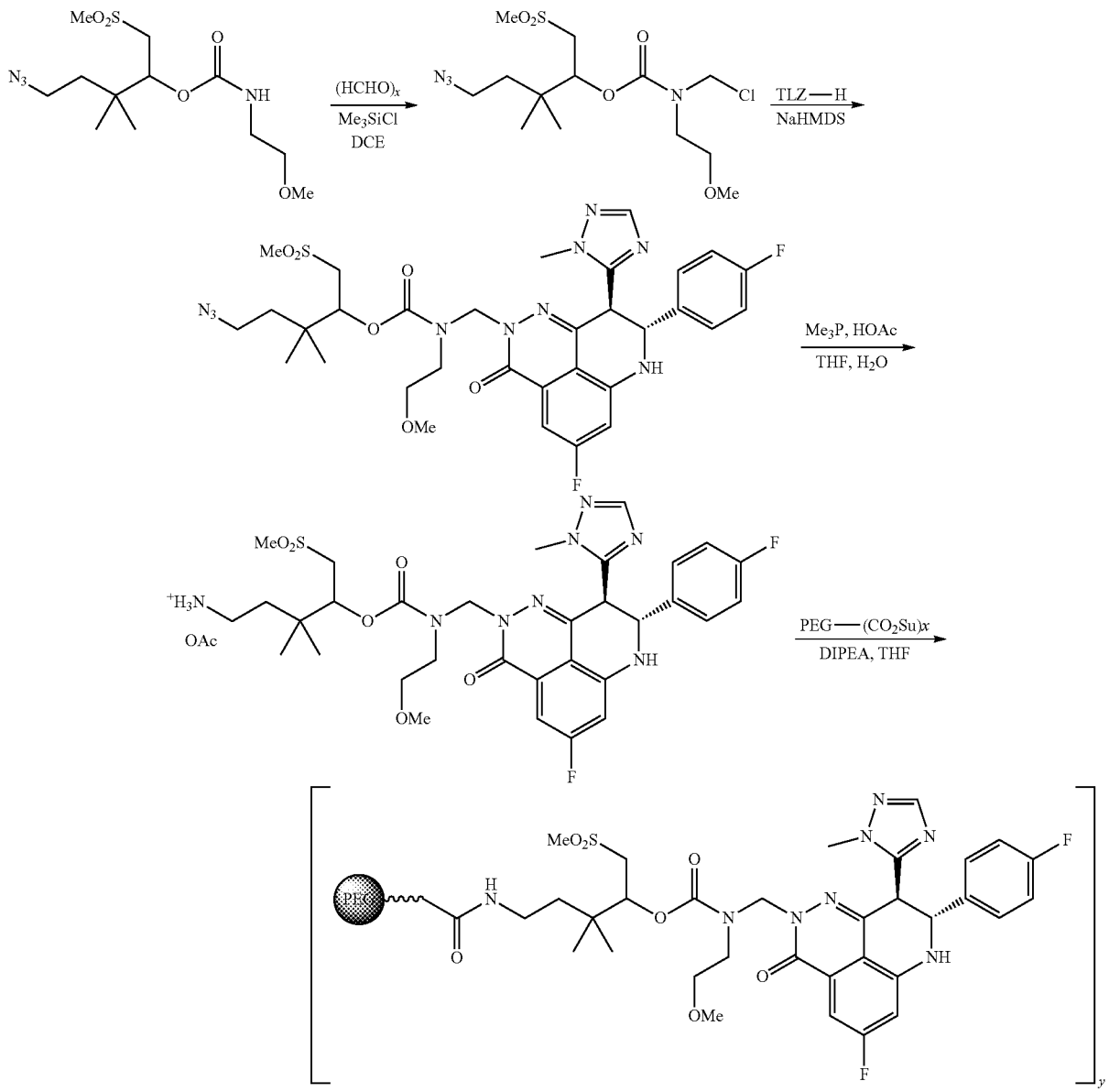

The azido-linker-talazoparib of Formula (II) wherein Z=azide, n=2, $R^1$=MeSO$_2$, $R^2$=H, each $R^4$=Me, Y=N($R^7$)CH$_2$, $R^7$=2-methoxyethyl, and D=talazoparib (Example 1), is dissolved in THF, cooled on ice, and treated with acetic acid (2.5 Eq) followed by 1.0 M trimethylphosphine in THF (5.0 Eq). The reaction is allowed to proceed until the azide has disappeared by HPLC analysis (~2 h), then water (10 Eq) is added to decompose the intermediate phosphinimine. The mixture is allowed to warm to ambient temperature, 20 volumes of methyl t-butylether (MTBE) is added, and the phases are separated. The aqueous phase is collected, washed with MTBE, then dried under vacuum to provide the ammonium salt, which may be purified by preparative reversed-phase HPLC using water and acetonitrile containing 0.1% trifluoroacetic acid, then dried under vacuum. The dried ammonium salt is dissolved in THF and added to a solution of 4-arm 40-kDa PEG-(succinimidyl ester)$_4$ (0.9 Eq of succinimidyl ester relative to ammonium salt) in THF under N$_2$-atmosphere, followed by N,N-diisopropyl-ethyl-amine (2 Eq). Once the reaction has completed (~1 hour), the product is precipitated by slow addition of the reaction mixture to 5 volumes of stirred ice-cold MTBE, collected by filtration, and dried under vacuum to give the conjugate of Formula (III) wherein M is a 40-kDa, 4-armed PEG, Z* is carboxamide, n=2, $R^1$=MeSO$_2$, $R^2$=H, each $R^4$=Me, Y=N(CH$_2$CH$_2$OMe)CH$_2$, D=talazoparib, and y=4.

A variety of PEG-succinimidyl esters of average molecular weights from 10-40 kDa are commercially available and suitable for use in the above methods. These have the general formula W—{[CH$_2$CH$_2$O]$_q$(CH$_2$)$_r$COOSu}$_y$, wherein W is a core group or an end-capping group, q=the number of ethylene oxide monomers per PEG chain as discussed above, r=1-6, and y=1-8. Typical W core groups include pentaerythritol (y=4), hexaglycerol (y=8), tripentaerythritol (y=8), dipentaerythritol (y=6), sorbitol (y=6), glycerol (y=3), and other polyols that serve to attach multiple PEG chains to a central point. In particular embodiments, W is pentaerythritol and y=4. Typical end-capping W groups include (C$_1$-C$_6$) alkoxy and carbohydrate groups. When y=2, the PEG has the formula (SuOOC)(CH$_2$)$_r$O[CH$_2$CH$_2$O]$_q$(CH$_2$)$_r$COOSu.

Conjugates wherein Z*=carbamate may be prepared by substituting the PEG-(succinimidyl ester) for an activated PEG-carbonate, for example a PEG-(nitrophenyl carbonate). Conjugates wherein Z*=urea may be prepared by substituting the PEG-(succinimidyl ester) for a PEG-isocyanate.

Example 13

Preparation of Conjugates Wherein M is an Insoluble Macromolecular Carrier

Preparation of hydrogel carriers comprising cros slinks that degrade by beta-elimination and their preparation as injectable microspheres has been previously described, for example in U.S. Pat. No. 9,649,385, PCT Publication WO2019/152672, and Henise et al., Engineering Reports, 7 Apr. 2020, e12213. These insoluble macromolecular carriers may be used for preparation of conjugates of inhibitors of DNA damage response following known methods as follows. In one embodiment, a sterile suspension of the hydrogel microspheres comprising free amino groups suspended in an unreactive organic solvent such as acetonitrile is treated with a agent that attaches activating group Z' to the amino groups. After washing the activated carrier M-Z' with solvent to remove any excess reagents and byproducts, the linker-drug of Formula (II) is added together with any additional reagents required to effect reaction of functional groups Z on the linker drug with Z' on the activated carrier to form the conjugate of Formula (I) M-(Z*-L-D)$_y$, wherein M is an insoluble macromolecular carrier and y is a number describing the concentration of L-D on M.

Following the procedure of Henise et al. (2020), a sterile suspension of hydrogel microspheres in acetonitrile is reacted with an excess (1.5 molar equivalents over hydrogel amine) of the cyclooctyne reagent 5-hydroxycyclooctyne succinimidyl carbonate and triethylamine (4 molar equivalents). After stirring 14 h at ambient temperature, the suspension is drained and the activated microspheres M-(Z')$_y$ wherein Z'=cyclooctyne are washed to remove excess reagents and byproducts. Any unreacted amino groups are capped by treating with acetic anhydride. Next, 1.2 equivalents (relative cyclooctyne groups) of the azido-linker-drug of Example 1 is added to the reactor followed by heating the reactor to 37° C. for 90 hours to complete the conjugation reaction. The resulting conjugate M-(Z*-L-D)$_y$ is then washed to remove unreacted reagents and byproducts, and then optionally exchanged into a formulation buffer suitable for administration.

All documents cited in the present disclosure are incorporated herein by reference.

The invention claimed is:

1. A conjugate having the formula

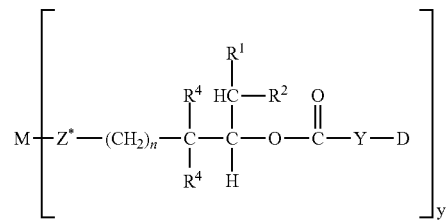

wherein M is PEG;
y is a number describing the number of linker-drugs L-D attached to M, wherein L is —Z*—(CH$_2$)$_n$—C(R$^4$)$_2$—CH(CH(R$^1$)(R$^2$)—O—C(=O)—Y—;
D is selected from the group consisting of rucaparib, talazoparib, and olaparib;
Z* is a carboxamide, carbamate, urea, oxime, thioether, or triazole;
n is 0-6;
R$^1$ and R$^2$ are each independently H, CN, or SO$_2$R$^5$, wherein R$^5$ is optionally substituted C$_1$-C$_6$ alkyl, optionally substituted aryl, optionally substituted heteroaryl, or N(R$^6$)$_2$, wherein each R$^6$ is independently optionally substituted C$_1$-C$_6$ alkyl, optionally substituted aryl, optionally substituted heteroaryl, or wherein N(R$^6$)$_2$ forms a ring of 4-8 atoms;
each R$^4$ is independently H or C$_1$-C$_3$ alkyl or both R$^4$ groups taken together form a 3-6 membered ring;
Y has the formula N(R$^7$)CH$_2$, wherein R$^7$ is optionally substituted C$_1$-C$_4$ alkyl or optionally substituted aryl;
and wherein at least one of R$^1$ and R$^2$ is other than H.

2. The conjugate of claim 1, wherein D is rucaparib.

3. The conjugate of claim 1, wherein D is connected to linker L through an alkyl linkage to a non-basic nitrogen atom of D.

4. The conjugate of claim 1, wherein M has a molecular weight between 1,000 and 100,000 Daltons, and y=1-8.

5. The conjugate of claim 1, wherein M has a hydrodynamic radius between 5 and 50 nm.

6. The conjugate of claim 1, wherein Z* is a carboxamide, carbamate, urea, oxime, thioether, or 1,2,3-triazole.

7. The conjugate of claim 1, having the formula

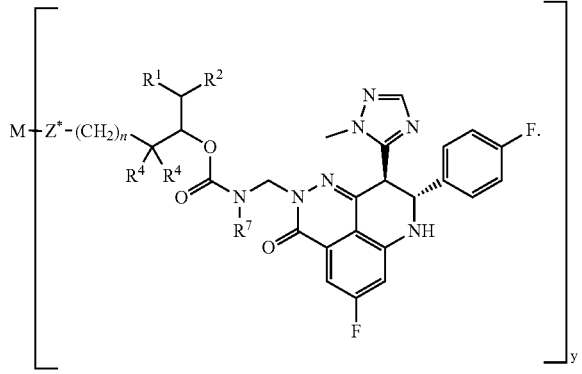

wherein y is 1, 2, 3, or 4.

8. The conjugate of claim 7, wherein M is a 40-kDa 4-armed PEG and y=4.

9. The conjugate of claim 7, wherein Z* is carboxamide, carbamate, oxime, thioether, or triazole.

10. The conjugate of claim 1, having the formula

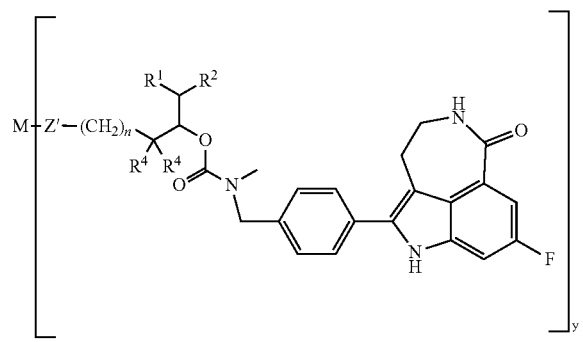

wherein y is 1, 2, 3, or 4.

11. The conjugate of claim 10, wherein M is a 40-kDa 4-armed PEG and y=4.

12. The conjugate of claim 1, wherein Z* is a 1,2,3-triazole.

13. The conjugate of claim 1, wherein Z* is a triazole, n is 4, $R^1$ is $MeSO_2$, $R^2$ is H, each $R^4$ is H, $R^7$ is 2-methoxyethyl, y is 4, and D is talazoparib.

14. The conjugate of claim 1, wherein Z* is a triazole, n is 4, $R^1$ is $MeSO_2$, $R^2$ is H, each $R^4$ is H, $R^7$ is 2-methoxyethyl, y is 4, and D is olaparib.

15. The conjugate of claim 1, wherein Z* is a triazole, n is 2, $R^1$ is $MeSO_2$, $R^2$ is H, each $R^4$ is Me, $R^7$ is 2-methoxyethyl, y is 1, and D is talazoparib.

16. The conjugate of claim 1, wherein Z* is a triazole, n is 4, $R^1$ is $MeSO_2$, $R^2$ is H, each $R^4$ is H, $R^7$ is methyl, y is 1, and D is rucaparib.

* * * * *